US012764581B2

(12) United States Patent
Yerramalli et al.

(10) Patent No.: US 12,764,581 B2
(45) Date of Patent: Oct. 13, 2026

(54) MEASUREMENT REPORTING PRIORITY FOR LOS-NLOS SIGNALS

(71) Applicant: QUALCOMM Incorporated, San Diego, CA (US)

(72) Inventors: Srinivas Yerramalli, San Diego, CA (US); Mukesh Kumar, Hyderabad (IN); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 395 days.

(21) Appl. No.: 18/559,033

(22) PCT Filed: Jun. 10, 2022

(86) PCT No.: PCT/US2022/033032

§ 371 (c)(1),
(2) Date: Nov. 3, 2023

(87) PCT Pub. No.: WO2023/287530

PCT Pub. Date: Jan. 19, 2023

(65) Prior Publication Data

US 2024/0236743 A1 Jul. 11, 2024

(30) Foreign Application Priority Data

Jul. 16, 2021 (GR) .............................. 20210100481

(51) Int. Cl.
*H04W 24/10* (2009.01)
*H04B 17/318* (2015.01)
(Continued)

(52) U.S. Cl.
CPC .......... *H04W 24/10* (2013.01); *H04B 17/328* (2023.05); *H04L 5/0051* (2013.01); *H04W 16/28* (2013.01)

(58) Field of Classification Search
CPC ..... H04W 24/10; H04W 16/28; H04W 24/08; H04W 64/00; H04B 17/328; H04B 7/063;
(Continued)

(56) References Cited

U.S. PATENT DOCUMENTS

2013/0235742 A1* 9/2013 Josiam ............... H04B 7/06952 370/252
2021/0266773 A1* 8/2021 Lee ....................... H04W 64/00
(Continued)

FOREIGN PATENT DOCUMENTS

WO 2020067964 A1 4/2020

OTHER PUBLICATIONS

International Search Report and Written Opinion—PCT/US2022/033032—ISA/EPO—Sep. 16, 2022.
(Continued)

*Primary Examiner* — John D Blanton
(74) *Attorney, Agent, or Firm* — Procopio, Cory, Hargreaves & Savitch LLP/QUALCOMM Incorporated

(57) ABSTRACT

A first wireless device receives, from a second wireless device, one or more of an indication of a maximum number of measurement reports or an indication of a threshold probability associated with at least one of an LOS probability or an NLOS probability for a plurality of signal or beam paths. The first wireless device calculates at least one of an LOS probability or an NLOS probability of at least one signal or beam path of the plurality of signal or beam paths. The first wireless device transmits, to the second wireless device, one or more indications of signal or beam information associated with the at least one signal or beam path based on one or more of the maximum number of measurement reports or the threshold probability, the one or more indications of signal or beam information including at least one of the LOS probability or the NLOS probability.

23 Claims, 10 Drawing Sheets

(51) Int. Cl.
*H04L 5/00* (2006.01)
*H04W 16/28* (2009.01)

(58) Field of Classification Search
CPC . H04B 7/06952; H04L 5/0051; H04L 5/0048; G01S 5/0018; G01S 5/02521
See application file for complete search history.

(56) References Cited

U.S. PATENT DOCUMENTS

| | | | | |
|---|---|---|---|---|
| 2023/0056394 | A1* | 2/2023 | Priyanto | G01S 5/0036 |
| 2023/0256997 | A1* | 8/2023 | Lee | B60W 50/00 701/23 |
| 2023/0288517 | A1* | 9/2023 | Walk | H04B 7/06952 |
| 2023/0397151 | A1* | 12/2023 | Meng | H04W 64/00 |
| 2024/0007181 | A1* | 1/2024 | Lauridsen | H04B 7/18513 |
| 2024/0236743 | A1* | 7/2024 | Yerramalli | H04B 7/063 |
| 2025/0081142 | A1* | 3/2025 | Hasegawa | G01S 19/34 |

OTHER PUBLICATIONS

Nokia et al., "Views on LoS/NLOS Identification and Mitigation", 3GPP TSG RAN WG1 #105-e, R1-2105516, 3rd Generation Partnership Project, Mobile Competence Centre, 650, Route Des Lucioles, F-06921 Sophia-Antipolis Cedex, France, vol. RAN WG1, No. e-Meeting, May 10, 2021-May 27, 2021, May 11, 2021, 6 Pages, XP052006398, chapters 2.1 and 2.2.

* cited by examiner

MEASUREMENT REPORTING PRIORITY FOR LOS-NLOS SIGNALS

CROSS-REFERENCE TO RELATED APPLICATIONS

This application is a National Stage Application filed under 35 U.S.C. § 371 of PCT International Application Serial No. PCT/US2022/033032 entitled "MEASUREMENT REPORTING PRIORITY FOR LOS-NLOS SIGNALS" and filed on Jun. 10, 2022, which claims the benefit of Greek patent application Ser. No. 20210100481, entitled "MEASUREMENT REPORTING PRIORITY FOR LOS-NLOS SIGNALS" and filed on Jul. 16, 2021, which are expressly incorporated by reference herein in their entirety.

TECHNICAL FIELD

The present disclosure relates generally to communication systems, and more particularly, to wireless communication involving signal measurement reporting.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IOT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus receives, from a second wireless device, one or more of an indication of a maximum number of measurement reports or an indication of a threshold probability associated with at least one of a line-of-sight (LOS) probability or a non-LOS (NLOS) probability for a plurality of signal or beam paths. The apparatus calculates at least one of an LOS probability or an NLOS probability of at least one signal or beam path of the plurality of signal or beam paths. The apparatus transmits, to the second wireless device, one or more indications of signal or beam information associated with the at least one signal or beam path based on one or more of the maximum number of measurement reports or the threshold probability, the one or more indications of signal or beam information including at least one of the LOS probability or the NLOS probability.

In an aspect of the disclosure, a method, a computer-readable medium, and an apparatus are provided. The apparatus configures one or more of a maximum number of measurement reports or a threshold probability associated with at least one of an LOS probability or an NLOS probability for a plurality of signal or beam paths. The apparatus transmits, to a first wireless device, one or more of an indication of the maximum number of measurement reports or an indication of the threshold probability associated with at least one of the LOS probability or the NLOS probability for the plurality of signal or beam paths. The apparatus receives, from the first wireless device, one or more indications of signal or beam information associated with the at least one signal or beam path based on one or more of the maximum number of measurement reports or the threshold probability, the one or more indications of signal or beam information including at least one of the LOS probability or the NLOS probability.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
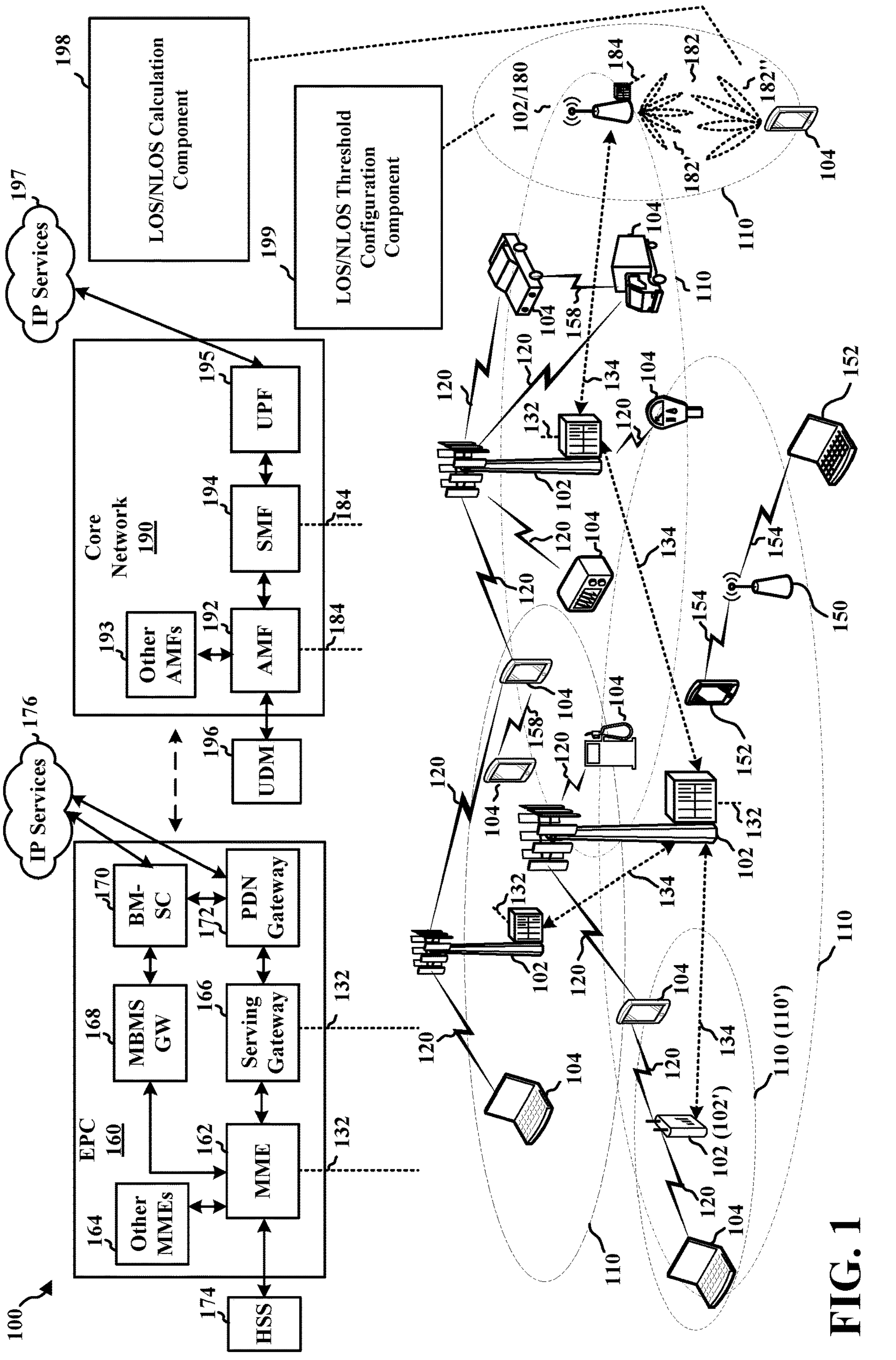
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

Aspects presented herein may enable a wireless device to determine and/or prioritize measurement reporting related to LOS/NLOS signals/channels. Aspects presented herein may enable a wireless device to prioritize measurement reporting associated with one or more LOS/NLOS channel(s)/resource(s) if there is a limited amount of resources that the wireless device may report to another wireless device because of payload limitation.

In certain aspects, the UE 104 may include an LOS/NLOS calculation component 198 configured to compute and report LOS and/or NLOS probability for at least some of arriving signal/beam paths. In one configuration, the LOS/NLOS calculation component 198 may be configured to receive, from a second wireless device, one or more of an indication of a maximum number of measurement reports or an indication of a threshold probability associated with at least one of an LOS probability or an NLOS probability for a plurality of signal or beam paths. In such configuration, the LOS/NLOS calculation component 198 may calculate at least one of an LOS probability or an NLOS probability of at least one signal or beam path of the plurality of signal or beam paths. In such configuration, the LOS/NLOS calculation component 198 may transmit, to the second wireless device, one or more indications of signal or beam information associated with the at least one signal or beam path based on one or more of the maximum number of measurement reports or the threshold probability, the one or more indications of signal or beam information including at least one of the LOS probability or the NLOS probability.

In certain aspects, the base station 102/180 may include an LOS/NLOS threshold configuration component 199 configured to signal/configure a wireless device with a threshold probability and/or a number of measurement reports to be transmitted by the wireless device. In one configuration, the LOS/NLOS threshold configuration component 199 may be configured to configure one or more of a maximum number of measurement reports or a threshold probability associated with at least one of an LOS probability or an NLOS probability for a plurality of signal or beam paths. In such configuration, the LOS/NLOS threshold configuration component 199 may transmit, to a first wireless device, one or more of an indication of the maximum number of measurement reports or an indication of the threshold probability associated with at least one of the LOS probability or the NLOS probability for the plurality of signal or beam paths. In such configuration, the LOS/NLOS threshold configuration component 199 may receive, from the first wireless device, one or more indications of signal or beam information associated with the at least one signal or beam path based on one or more of the maximum number of measurement reports or the threshold probability, the one or more indications of signal or beam information including at least one of the LOS probability or the NLOS probability.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHZ (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHZ, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHz). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHZ-114.25 GHZ), and FR5 (114.25 GHZ-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHZ spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figures 2A, 2B, 2C, 2D:
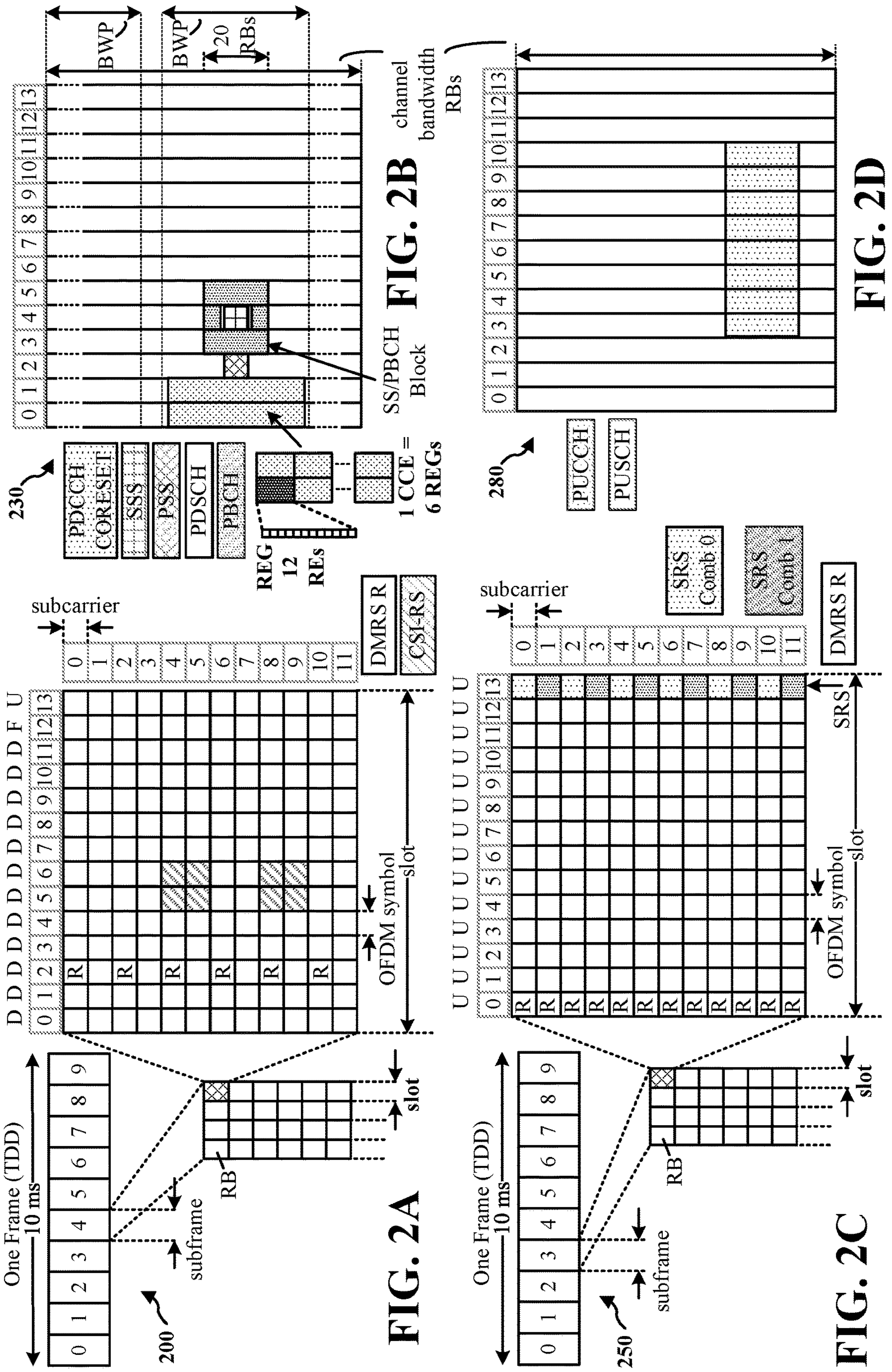
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A. 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15$[kHz] | Cyclic prefix |
|---|---|---|
| 0 | 15 | Normal |
| 1 | 30 | Normal |

-continued

| $\mu$ | SCS $\Delta f = 2^{\mu} \cdot 15$[kHz] | Cyclic prefix |
|---|---|---|
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology $\mu$=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
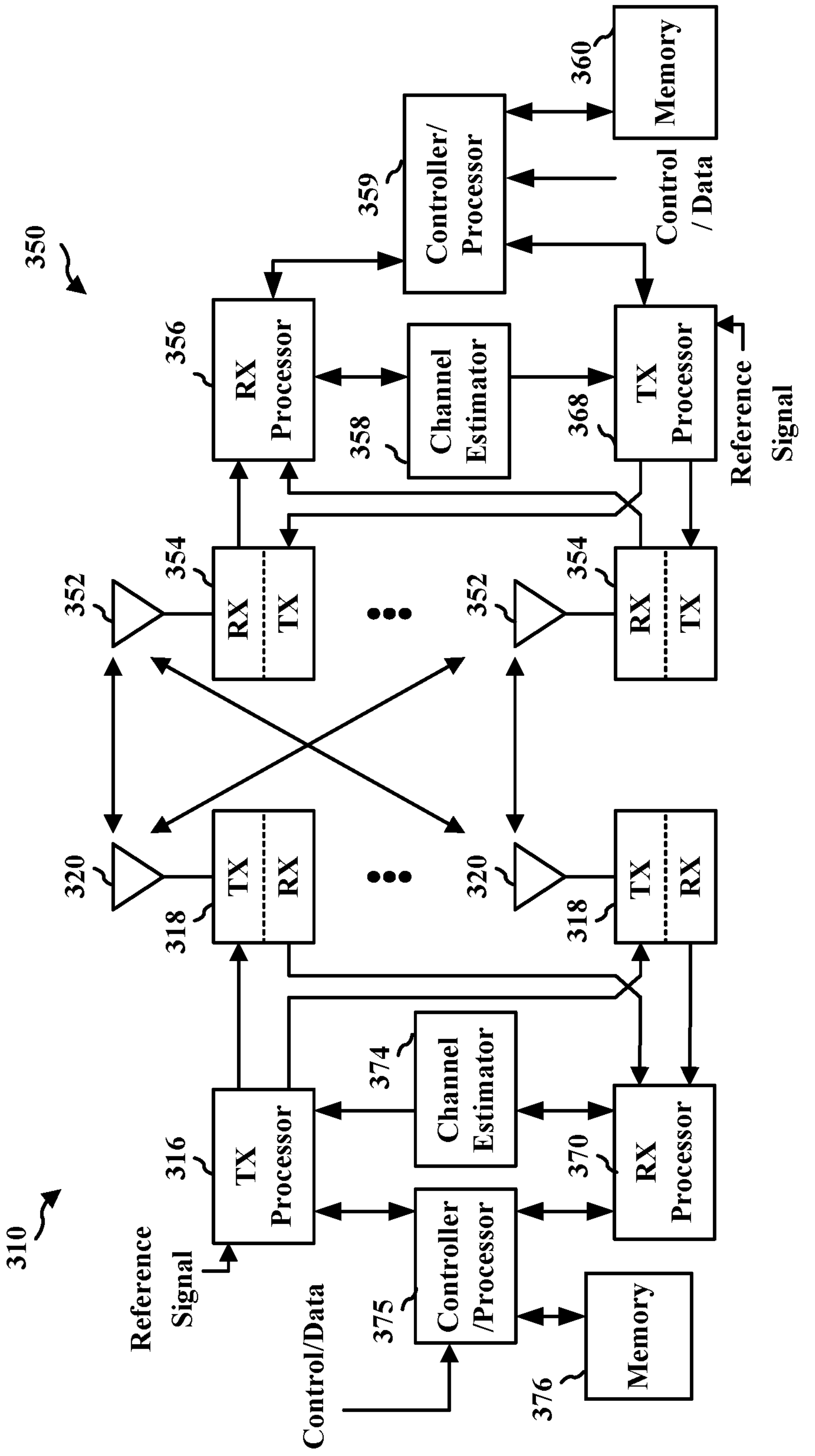
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging. RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/ processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBS, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the LOS/NLOS calculation component 198 of FIG. 1.

At least one of the TX processor 316, the RX processor 370, and the controller/processor 375 may be configured to perform aspects in connection with the LOS/NLOS threshold configuration component 199 of FIG. 1.

Figure 4:
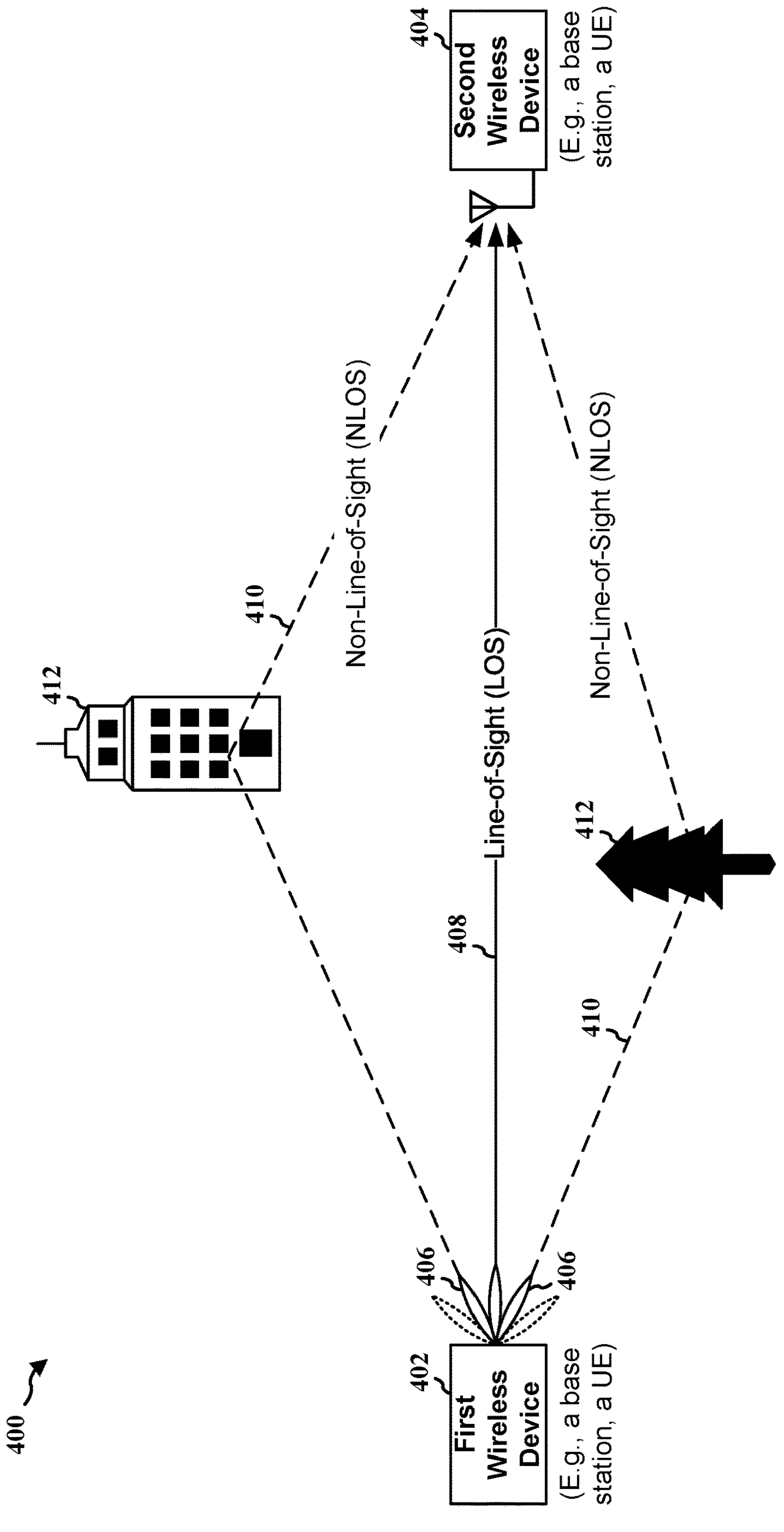
FIG. 4 is a diagram illustrating an example communication between wireless devices involving line-of-sight (LOS) and non-line-of-sight (NLOS) channels in accordance with various aspects of the present disclosure.

FIG. 4 is a diagram 400 illustrating an example communication between wireless devices involving line-of-sight (LOS) and non-line-of-sight (NLOS) channels in accordance with various aspects of the present disclosure. A first wireless device 402 (e.g., a base station, a UE, a positioning reference device, a sidelink device, etc.) may be configured or scheduled to transmit data to a second wireless device 404 (e.g., a base station, a UE, a positioning reference device, a sidelink device, etc.), where the data may be transmitted from multiple beams 406 of the first wireless device 402. In some scenarios, as shown at 408, the data transmitted from some of the multiple beams 406 may reach the second wireless device 404 directly without being obstructed by obstacle(s), whereas, as shown at 410, the data transmitted from some of the multiple beams 406 may reach the second wireless device 404 indirectly via reflection, refraction, and/or penetration, etc. (e.g., one or more objects 412 may obstruct or may be within the transmission path of the data). In other words, when a signal/data is transmitted from a transmitter to a receiver in multiple signal/beam paths (or channels), the same signal/data may reach the receiver from multiple directions with different delays and/or signal powers. For example, a signal traveling through the paths/channels shown at 410 may reach the second wireless device 404 later and/or with a weaker power compared to the signal traveling through the path/channel shown at 408 (e.g., a path/channel without obstructions).

For purposes of the present disclosure, a signal/data transmission without being obstructed by obstacle(s) may be referred to as a "line-of-sight (LOS) transmission," a "LOS signal/data." a "signal/data transmitted via an LOS channel," etc., whereas a signal/data transmission that is obstructed by obstacle(s) may be referred to as a "non-line-of-sight (NLOS) transmission," a "NLOS signal/data," a "signal/data transmitted via a NLOS channel," etc., (e.g., signal/data transmission involving reflection, refraction, and/or penetration, etc.). Signal reflection may be referring to a signal transmitted from a transmitter (e.g., the first wireless device 402) in a signal/beam path that is bounced off one or more objects (e.g., the objects 412) before reaching a receiver (e.g., the second wireless device 404). Signal refraction may refer to a signal that is transmitted from a transmitter in a signal/beam path and changes its direction as it passes through an obstacle (e.g., a material or a medium in which the signal is able to pass/penetrate through) before reaching a receiver. Signal penetration may refer to a signal that is transmitted from a transmitter in a signal/beam path and penetrates an object or medium before reaching a receiver.

A wireless device may be able to classify or predict (e.g., based on a probability) whether a signal/data received in a signal/beam path (or channel) is based on LOS or NLOS. For example, a wireless device may be able to determine whether one or more signal/beam paths are likely to be LOS paths or NLOS paths based on the shape or statistical properties of channel impulse responses (CIRs) derived from signals transmitted via the one or more signal/beam paths, such as based on the confidence matrix, the delay spread, the power delay profile, and/or the narrowband factor associated with the one or more signal/beam paths.

For example, a wireless device may be configured to classify NLOS and LOS channels by forming/obtaining a set of features from a CIR, and then the wireless device may run a classifier for one or more signal/beam paths based on the obtained features. In such an example, features that may be obtained from a CIR may include a rise time, a delay spread, Kurtosis, and/or an energy associated with the CIR. The rise time may be a time between a first peak above a noise threshold and a largest peak. The delay spread may be a time between the first peak above the noise threshold and a last peak above the noise threshold. Kurtosis may be a normalized (with regard to a second moment) fourth moment of the CIR. The energy may be a path loss exponent.

For example, the rise time for a signal/beam path may be high when the signal/beam path is not a main energy path and there is a time gap between the signal/beam path and the main energy path. This may arise in a situation when an LOS path is partially blocked, and hence has a low energy, and there is a stronger reflected path arriving slightly later. For most LOS scenarios, the rise time may be fairly small and hence the rise time may be useful for LOS/NLOS classification/prediction. In another example, the delay spread of the LOS channels may be relatively small compared to the NLOS channels, where NLOS channels may include multiple reflections following a main reflection which may result in a larger delay spread. Thus, the delay spread may also be useful for LOS/NLOS classification/prediction. In another example, the Kurtosis may be interpreted as an amount of “peakedness” of a CIR. For LOS channels, the Kurtosis may be a large number that indicates a sharp peak around a main energy peak. On the other hand, for NLOS channels, the Kurtosis may be a small number which may denote a relatively fat main peak or a skewed (e.g., to the right) CIR. In another example, the LOS/NLOS classification may be based on the exponent of the path-loss. For example, if a transmit power and an antenna gain are known, a distance between a transmitter and a receiver may be estimated based on a range estimation algorithm. Then, based on the estimated distance, a path-loss exponent may be evaluated via an equation: $P_R = C - 10\alpha \log dist$, where C may be a constant including the Tx power and the antenna gain and other free-space constants, and a may be the path-loss exponent. In some examples, if the path-loss exponent is close to 1.6 (e.g., for an indoor environment), it is likely that the channel is an LOS channel. On the other hand, if the path-loss exponent is around 3, it is likely that that the channel is an NLOS channel.

NLOS/LOS classification may be useful for navigation, positioning, and/or ranging applications. For example, a communication between two wireless devices (e.g., the first wireless device 402 and the second wireless device 404) may include a combination of direct path (e.g., as shown at 408) and indirect paths (e.g., as shown at 410) resulting from multiple reflections, absorptions, and/or scattering of the electromagnetic wave emitted from the transmitting wireless device. While a goal of ranging measurements is to provide a good estimate of the time of arrival (TOA) of a signal/beam path (or a first path), the signal/beam path may be subject to a number of impairments such as partial or total obstruction or the signal/beam path may be faded. In some examples, a reflected path may have a higher energy than a non-reflected path. As such, a ranging algorithm based on detecting peak energy may potentially suffer from errors in a range measurement. In such scenarios, it may be useful for a wireless device to indicate or to determine whether a channel is an LOS channel or an NLOS channel, such that a positioning engine (or a filtering algorithm) may weigh the range measurement to enhance the estimate of the positioning/ranging. For example, for round-trip time (RTT) measurements, a first wireless device may perform an LOS/NLOS classification/predication for a channel, such as based on the features associated with CIR (e.g., the rise time, the delay spread, Kurtosis, the energy, etc.). Based on the classification/prediction results, the first wireless device may indicate to a second wireless device or a location management function (LMF) whether the channel is an LOS channel or a NLOS channel, such that the second wireless device or the LMF may perform a more accurate range estimation (e.g., the receiving device may take the LOS/NLOS conditions into account when calculating a range based on the RTT).

In some examples, a first wireless device (e.g., a UE, a positioning reference device, a transmission-reception point (TRP), a base station, an LMF, etc.) may indicate whether one or more UL uplink channels, DL channels, and/or sidelink channels (e.g., between two sidelink devices such as sidelink UEs and RSUs) are LOS channels or NLOS channels to a second wireless device by transmitting LOS/NLOS indicator(s) to the second wireless device. In some examples, a “positioning reference device” may refer to a device with a limited or reduced functions (e.g., functions related or associated with positioning), where the positioning reference device may include an expanded set of measurement capabilities. For example, a positioning reference device may include some limited functions of a UE but with an expanded set of measurement capabilities for position reference signal (PRS) and/or transmission of sounding reference signal (SRS).

In one example, an LOS/NLOS indicator may be configured to be a binary value indicator, which may also be referred to as a hard value indicator. For the binary value indicator, a first wireless device may use a bit (e.g., bit one (1) or bit zero (0)) to indicate to a second wireless device whether a channel is an LOS channel or an NLOS channel (e.g., bit one may indicate the LOS channel and bit zero may indicate the NLOS channel, or vice versa). In another example, an LOS/NLOS indicator may be configured to be a soft value indicator, where the LOS/NLOS indicator may include a probability (e.g., 70%, 50%, 25%, etc.) of a channel being an LOS channel or an NLOS channel, and/or the LOS/NLOS indicator may include additional channel information/measurements, such as an angle, a timing, a phase, and/or a power associated with the channel. For example, for a transmission involving multiple signal/beam paths, a wireless device (e.g., a TRP) may be configured to report an angle, a timing (e.g., TOA, delays, etc.), phase (of N paths), and/or power for N paths to an LMF to enhance a UE positioning mechanism/process (e.g., UE-based positioning, UE-assisted positioning, etc.). However, in some scenarios, if there are limited radio resources (e.g., the channels are congested), an amount of information (e.g., LOS/NLOS related information) that a wireless device is able to report/indicate to another wireless device may be limited.

Aspects presented herein may enable a wireless device to determine and/or prioritize measurement reporting related to LOS/NLOS signals/channels. Aspects presented herein may enable a wireless device to prioritize measurement reporting associated with one or more LOS/NLOS channel(s)/resource(s) if there is a limited amount of resources that the wireless device may use for reporting to another wireless device because of a payload (capacity) limitation. For example, a wireless device may be configured to prioritize the measurement reporting for a plurality of signal/beam paths based on the LOS/NLOS classification associated with the plurality of signal/beam paths, and/or based on one or more LOS/NLOS features (e.g., features obtained based on CIR) associated with the plurality of signal/beam paths, etc.

In one aspect of the present disclosure, for a plurality of channels and/or resources (e.g., positioning reference signal (PRS) and/or sounding reference signal (SRS) resources), a wireless device may be configured to report measurements for at least some of the plurality of channels and/or resources based on a hard LOS/NLOS classification (e.g., based on binary value indicators) and/or based on a soft LOS/NLOS probability. In another aspect, a wireless device may be configured to report measurements for additional/multiple signal/beam paths if the additional/multiple signal/beam paths are able to be classified as LOS/NLOS and/or be assigned with an LOS/NLOS probability.

For example, a measurement report may indicate probabilities for one or more signal or beam paths/resources measured by the wireless device being LOS or NLOS, which may be referred to as an LOS probability or an NLOS probability, respectively. In other examples, the measurement report may further include one or more measurements associated with the paths/resources, such as the timing, the phase angle, the delay, and/or the power associated with the measured paths/resources. For example, a measurement report may include:

First resource (e.g., PRS/SRS resource 1): ($\tau_1$, $p_1$), ($\tau_2$, $p_2$), ($\tau_3$, $p_3$), Second resource (e.g., PRS/SRS resource 2): ($\tau_4$, $p_4$), ($\tau_5$, $p_5$), ($\tau_6$, $p_6$), where $p_1$, . . . , $p_6$ may indicate the probabilities of six signal/beam paths (e.g., signal/beam path #1 to #6) associated with the first resource or the second resource being LOS or NLOS, respectively, and $\tau_1$, . . . , $\tau_6$ may indicate additional measurements associated with the signal/beam paths. For example, if a wireless device is configured to report LOS probabilities for six signal/beam paths associated with a first PRS resource (e.g., PRS resource 1) and a second PRS resource (e.g., PRS resource 2) along with their delays (e.g., $\tau$=delays in microseconds (ms)), the wireless device may generate a measurement report that includes:

*PRS* resource 1: (10, 0.8), (10, 0.1), (15, 0.05),

*PRS* resource 2: (20, 0.5), (15, 0.4), (10, 0.3).

The measurement report may indicate that the first path associated with the first PRS resource has an 80% probability of being an LOS resource/path (e.g., $p_1$=0.8) and a delay of 10 ms (e.g., $\tau_1$=10), the second path associated with the first PRS resource has a 10% probability of being an LOS resource/path (e.g., $p_2$=0.1) and a delay of 10 ms (e.g., $\tau_2$=10), the third path associated with the first PRS resource has a 5% probability of being an LOS resource/path (e.g., $p_3$=0.05) and a delay of 15 ms (e.g., $\tau_3$=15), the four path associated with the second PRS resource has a 50% probability of being an LOS resource/path (e.g., $p_4$=0.5) and a delay of 20 ms (e.g., $\tau_4$=20), the fifth path associated with the second PRS resource has a 40% probability of being an LOS resource/path (e.g., $p_5$=0.4) and a delay of 15 ms (e.g., $\tau_5$=15), and the sixth path associated with the second PRS resource has a 30% probability of being an LOS resource/path (e.g., $p_6$=0.3) and a delay of 10 ms (e.g., $\tau_6$=10).

Figure 5:
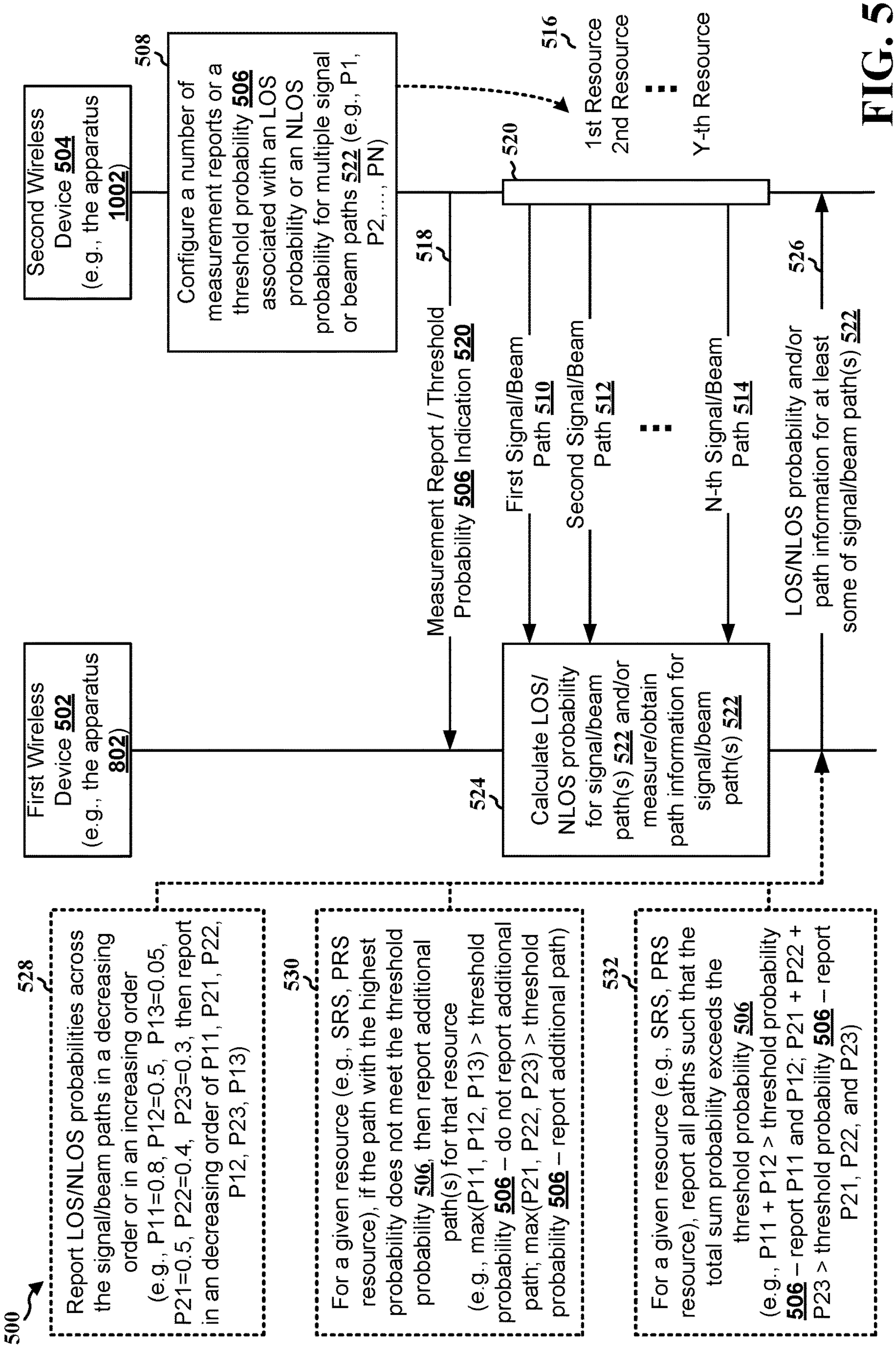
FIG. 5 is a communication flow illustrating an example of a wireless device determining which signal/beam path(s) to report based at least in part on LOS/NLOS probabilities associated with the signal/beam path(s) in accordance with various aspects of the present disclosure.

FIG. 5 is a communication flow 500 illustrating an example of a wireless device determining which signal/beam path(s) to report based at least in part on LOS/NLOS probabilities associated with the signal/beam path(s) in accordance with various aspects of the present disclosure. The numberings associated with the communication flow 500 do not specify a particular temporal order and are merely used as references for the communication flow 500. Aspects presented herein may enable a first wireless device (e.g., a UE, a positioning reference device, a base station, a TRP, etc.) to compute an LOS and/or NLOS probability for at least some of arriving signal/beam paths. Then, a second wireless device (e.g., a UE, a base station, a TRP, an LMF, etc.) may signal the first wireless device a threshold probability and/or a number of measurement reports to be transmitted, such that the first wireless device may report the LOS and/or NLOS probability for at least some of the signal/beam paths and/or measurements associated with the signal/beam paths based at least in part on the threshold probability and/or the number of measurement report.

At 508, a second wireless device 504 (e.g., a UE, a base station, a TRP, an LMF, etc.) may configure a number of measurement reports (e.g., a maximum number of measurement report) or a threshold probability 506 associated with an LOS probability or an NLOS probability (e.g., the probability of a signal/beam path being LOS or NLOS) for multiple signal/beam paths 522, which may include a first signal/beam path 510, a second signal/beam path 512, and up to a N-th signal/beam path 514, etc. As shown at 516, the multiple signal/beam paths may further be associated with a plurality of resources, such as PRS resources, SRS resources, etc. For example, a first PRS resource may be associated with the first signal/beam path 510, the second signal/beam path 512, and up to the N-th signal/beam path 514; a second PRS resource may also be associated with the first signal/beam path 510, the second signal/beam path 512, and up to the N-th signal/beam path 514; and a Y-th PRS resource may also be associated with the first signal/beam path 510, the second signal/beam path 512, and up to the N-th signal/beam path 514, etc. For purposes of the present disclosure, P1, P2, . . . , PN may be used to indicate LOS/NLOS probabilities for the first signal/beam path 510, the second signal/beam path 512, and up to the N-th signal/beam path 514. For example, P2=0.8 may indicate that the second signal/beam path 512 associated with a resource has an 80% probability of being an LOS channel/resource or an NLOS channel/resource. In addition, P11, P12, P1N, P21, P22, P2N, . . . , PYN may be used to indicate LOS/NLOS probabilities for the signal/beam paths and their associated resources. For example, P12=0.5 may indicate that the second signal/beam path 512 associated with a first resource (e.g., a first SRS resource or a first PRS resource) has a 50% probability of being an LOS channel/resource or an NLOS channel/resource; P21=0.4 may indicate that the first signal/beam path 510 associated with a second resource (e.g., a second SRS resource or a second PRS resource) has a 40% probability of being an LOS channel/resource or an NLOS channel/resource, etc.

At 518, the second wireless device 504 may transmit, to a first wireless device 502 (e.g., a UE, a positioning reference device, a base station, a TRP, an LMF, etc.), an indication 520 indicating the threshold probability 506 and/or the number of measurement reports (or size of measurement report) the first wireless device 502 may report. For example, the indication 520 may indicate an LOS threshold probability of 80% (e.g., LOS threshold probability=0.8), and/or a maximum number of reports the first wireless device 502 may report is N reports or X bits, etc.

At 520, the second wireless device 504 may transmit data/signals, such as reference signals (e.g., SRSs, PRSs, etc.), to the first wireless device 502 via the multiple signal/beam paths 522. For example, the second wireless device 504 may transmit reference signals associated with a first resource and a second resource (e.g., SRS resources, PRS resources, etc.) via the first signal/beam path 510, the second signal/beam path 512, and up to the N-th signal/beam path 514.

At 524, the first wireless device 502 may receive the data/signals from the second wireless device 504 via at least some of the multiple signal/beam paths 522, and the first wireless device 502 may calculate LOS probability, NLOS probability, or both, for one or more signal/beam paths of the multiple signal/beam paths 522 based on the data/signal received from the one or more signal/beam paths. In addition, the first wireless device 502 may also obtain or measure other information associated with the one or more signal/beam paths, such as the angle, timing, phase, and/or power associated with the one or more signal/beam paths. For example, the first wireless device 502 may calculate the LOS probability for the first signal/beam path 510, the second signal/beam path 512, and up to the N-th signal/beam path 514 (e.g., P1, P2, . . . , PN) that are associated with a first resource based on data/signals received via these signal/beam paths, and the first wireless device 502 may also obtain or measure the angle (e.g., angle of arrival), timing (e.g., TOA), phase, and/or power (e.g., reference signal received power (RSRP)) for these signal/beam paths.

At 526, the first wireless device 502 may transmit the calculated LOS/NLOS probabilities and/or the obtained/measured path information for at least some of the signal/beam path(s) 522 to the second wireless device 504, such as via a measurement report, where the number of signal/beam paths to be reported and/or types of information to be included in the measurement report may depend on the configured threshold probability 506 and/or the configured number of measurement reports (e.g., based on the indication 520). For example, the first wireless device 502 may include calculated LOS probabilities for the first signal/beam path 510, the second signal/beam path 512, and up to the N-th signal/beam path 514 associated with a first PRS resource in the measurement report. In addition, the first wireless device 502 may also include additional information associated with the reported signal/beam path(s) in the measurement report, such as the angle, timing, phase, and/or power associated with the reported signal/beam path(s).

Note while the communication flow 500 in FIG. 5 shows the second wireless device 504 transmits the indication 520 (e.g., the indication for the number of measurement reports and/or the threshold probability 506) to the first wireless device 502, and the second wireless device 504 receives the LOS/NLOS probabilities and/or the path information for at least some of signal/beam path(s) 522 based on the indication 520, in some examples, the first wireless device 502 may also receive the indication 520 and/or transmit the LOS/NLOS probability and/or the path information for at least some of signal/beam path(s) 522 to another device/entity (e.g., to a third wireless device that is not the second wireless device 504). For example, the first wireless device 502 may be a UE and the second wireless device 504 may be a TRP. As such, the first wireless device 502 may receive the indication 520 from an LMF or a base station, and/or the first wireless device 502 may transmit the LOS/NLOS probability and/or the path information for at least some of signal/beam path(s) 522 to the LMF or the base station. In another example, the first wireless device 502 may be a base station and the second wireless device may be a UE. In such an example, the first wireless device 502 may determine the number of measurement reports and/or the threshold probability 506 without receiving the indication 520 from the second wireless device 504.

In one aspect of the present disclosure, as shown at 528, the first wireless device 502 may be configured to report the LOS probabilities and/or the NLOS probabilities across the signal/beam paths 522 (or across some of the measured signal/beam paths 522) in a decreasing probability order or in an increasing probability order. For example, for a given resource (e.g., a PRS resource, an SRS resource, etc.), if the LOS probability for the first signal/beam path 510 is 80% (e.g., P1=0.8), the LOS probability for the second signal/beam path 512 is 5% (e.g., P2=0.05), and the LOS probability for the N-th signal/beam path 514 is 10% (e.g., PN=0.1), the first wireless device 502 may report the LOS probabilities and/or the path information associated with these signal/beam paths in a decreasing order of the first signal/beam path 510, the N-th signal/beam path 514, the second signal/beam path 512 (e.g., in an order of P1, PN, P2). In other words, the first wireless device 502 may report the signal/beam path with a highest LOS probability first, report the signal/beam path with a second highest LOS probability next, and report the signal/beam path with a lowest LOS probability last, etc. In some examples, if the first wireless device 502 is configured to report a defined number of reports or to transmit a measurement report with a limited payload capacity, the first wireless device 502 may drop LOS/NLOS probabilities and/or the path information for some of the signal/beam paths 522. For example, if the first wireless device 502 is configured to report LOS measurements for two signal/beam paths, the first wireless device 502 may report the LOS probability for the first signal/beam path 510 (e.g., P1) and the LOS probability for the N-th signal/beam path 514 (e.g., PN), and the first wireless device 502 may skip or drop the LOS probability reporting for the second signal/beam path 512.

In another example, for a given resource (e.g., a PRS resource, an SRS resource, etc.), if the NLOS probability for the first signal/beam path 510 is 60% (e.g., P1=0.6), the LOS probability for the second signal/beam path 512 is 15% (e.g., P2=0.15), and the LOS probability for the N-th signal/beam path 514 is 25% (e.g., PN=0.25), the first wireless device 502 may report the NLOS probabilities and/or the path information associated with these signal/beam paths in an increasing order of the second signal/beam path 512, the N-th signal/beam path 514, the first signal/beam path 510 (e.g., in an order of P2, PN, P1). In other words, the first wireless device 502 may report the signal/beam path with lowest NLOS probability first, report the signal/beam path with a second lowest NLOS probability next, and report the signal/beam path with highest NLOS probability last, etc. Similarly, if the first wireless device 502 is configured to report a defined number of reports or to transmit a measurement report with a limited payload capacity, the first wireless device 502 may drop/skip NLOS probabilities and/or the path information reporting for some of the signal/beam paths 522.

In another example, if multiple signal/beam paths are associated with multiple resources, the first wireless device 502 may also report LOS/NLOS measurements and/or the path information across paths of different resources in an increasing or decreasing order of LOS/NLOS probabilities. For example, the first signal/beam path 510, the second signal/beam path 512, and the third signal/beam path 514 (e.g., N=3) may each be associated with a first PRS resource (e.g., PRS resource 1) and a second PRS resource (e.g., PRS resource 2), such that there may be a total of six signal/beam paths. Example LOS probabilities for the six signal/beam paths are shown by the Table 1 below:

TABLE 1

Example LOS probabilities for multiple signal/beam paths and PRS resources

| Path # | Resource # | LOS Probability |
|---|---|---|
| First path 510 | PRS resource 1 | P11 = 0.8 |
| Second path 512 | PRS resource 1 | P12 = 0.1 |
| Third path 514 | PRS resource 1 | P13 = 0.05 |
| First path 510 | PRS resource 2 | P21 = 0.4 |
| Second path 512 | PRS resource 2 | P22 = 0.3 |
| Third path 514 | PRS resource 2 | P23 = 0.2 |

The first wireless device 502 may report the LOS probabilities and/or the path information associated with these signal/beam paths in a decreasing order of P11, P21, P22, P23, P12, and P13. Similarly, if the first wireless device 502 is configured to report a defined number of reports or to transmit a measurement report with a limited payload capacity, the first wireless device 502 may drop LOS probabilities and/or the path information for some of the signal/beam paths 522. For example, if the first wireless device 502 is configured to report LOS measurements for four signal/beam paths, the first wireless device 502 may include LOS probabilities P11, P21, P22, and P23 in the measurement report, and may skip/drop LOS probabilities P12 and P13 from the measurement report.

In another aspect of the present disclosure, as shown at 530, for a given resource, the first wireless device 502 may be configured to report the LOS probabilities and/or the NLOS probabilities based on whether a signal/beam path with a highest or lowest LOS/NLOS probability meets the threshold probability 506 for that resource. For example, the first wireless device 502 may be configured to report a signal/beam path with a highest LOS probability or a lowest NLOS probability without reporting other signal/beam paths if the highest/lowest LOS/NLOS probability meets the threshold probability 506. However, if the highest LOS probability or the lowest NLOS probability does not meet the threshold probability 506, the first wireless device 502 may include additional signal/beam path(s) information for the measurement reporting.

For example, if the threshold probability 506 is an LOS threshold probability and is configured to be 70% (e.g., LOS threshold probability=0.7), and the first signal/beam path 510, the second signal/beam path 512, and the third signal/beam path 514 (e.g., N=3) are each associated with a first PRS resource (e.g., PRS resource 1) and a second PRS resource (e.g., PRS resource 2) with calculated LOS probabilities as shown by the Table 1 above. As the highest LOS probability (e.g., P11=0.8) for the signal/beam paths associated with the first PRS resource meets the configured LOS threshold probability 506 (e.g., PRS resource 1, max(P11, P12, P13) is greater than or equal to the LOS threshold probability (0.7)), the first wireless device 502 may report the LOS probability and/or the path information for the first signal/beam path 510 for the first PRS resource, and may exclude/skip measurement reporting for the second signal/beam path 512 and the third signal/beam path 514.

On the other hand, as the highest LOS probability (e.g., P21=0.4) for the signal/beam paths associated with the second PRS resource does not meet the configured LOS threshold probability 506 (e.g., PRS resource 2, max(P21, P22, P23) is smaller than the LOS threshold probability (0.7)), the first wireless device 502 may report the LOS probability and/or the path information for more than one signal/beam path. In other words, the first wireless device 502 may include measurement reporting for additional signal/beam paths. For example, the first wireless device 502 may include LOS probabilities and/or the path information for the first signal/beam path 510, the second signal/beam path 512, and the third signal/beam path 514 in the measurement report for the second PRS resource.

In another aspect of the present disclosure, as shown at 532, for a given resource, the first wireless device 502 may be configured to report the LOS probabilities and/or the NLOS probabilities for one or more signal/beam paths based on the sum of the LOS probabilities and/or the NLOS probabilities, such as whether the sum of the LOS probabilities and/or the NLOS probabilities meets the threshold probability 506 or a defined number.

For example, if the threshold probability 506 is an LOS threshold probability and is configured to be 85% (e.g., LOS threshold probability=0.85), and the first signal/beam path 510, the second signal/beam path 512, and the third signal/beam path 514 (e.g., N=3) are each associated with a first PRS resource (e.g., PRS resource 1) and a second PRS resource (e.g., PRS resource 2) with calculated LOS probabilities as shown by the Table 1 above. For the first PRS resources, as the sum of the LOS probabilities for the first signal/beam path 510 (P11=0.8) and the second signal/beam path 512 (P12=0.1) exceeds the LOS threshold probability 506 (e.g., P11+P12=0.9 is greater than or equal to the LOS threshold probability (0.85)), the first wireless device 502 may include the LOS probabilities and/or the path information for the first signal/beam path 510 and the second signal/beam path 512 in the measurement report, and the first wireless device 502 may exclude the LOS probability and/or the path information for the third signal/beam path 514 from the measurement report. For the second PRS resources, as the sum of the LOS probabilities for the first signal/beam path 510 (P21=0.4), the second signal/beam path 512 (P22=0.3), and the third signal/beam path 514 (P23=0.2) exceeds the LOS threshold probability 506 (e.g., P21+P22+P23=0.9 is greater than or equal to the LOS threshold probability (0.85)), the first wireless device 502 may include the LOS probabilities and/or the path information for the first signal/beam path 510, the second signal/beam path 512, and the third signal/beam path 514 in the measurement report.

In such examples, the first wireless device 502 may perform the addition for calculating the sum of the LOS/NLOS probabilities in an increasing or in a decreasing probability order. Once the addition reaches or exceeds the configured threshold probability 506, the first wireless device 502 may stop the addition and report the LOS/NLOS probabilities for signal/beam paths being added. For example, the NLOS probabilities for five signal/beam paths of a given resource may be calculated as shown by the Table 2 below:

TABLE 2

Example NLOS probabilities for multiple signal/beam paths

| Path # | NLOS Probability |
|---|---|
| First path | P1 = 0.05 |
| Second path | P2 = 0.1 |
| Third path | P3 = 0.4 |
| Fourth path | P4 = 0.15 |
| Fifth path | P5 = 0.3 |

If the threshold probability 506 is an NLOS threshold probability and is configured to be 25% (e.g., NLOS threshold probability=0.25), the first wireless device 502 may be configured to add the NLOS probabilities in an increasing order starting from the lowest NLOS probability to the highest NLOS probability (e.g., in an order of P1, P2, P4, P5, P3) until the sum meets (or exceeds) the NLOS threshold probability. For example, the first wireless device 502 may first add the NLOS probability for the first path (P1) and the NLOS probability for the second path (P2), and the first wireless device 502 may obtain a sum of 0.15 (P1+P2=0.15). As the current sum does not meet the NLOS threshold probability (0.25), the first wireless device 502 may add the next NLOS probability (P4) into the current sum, which may yield a sum of 0.3 (P1+P2+P4=0.30) that exceeds the NLOS threshold probability (0.25). Then, the first wireless device 502 may stop the addition once the current sum meets the NLOS threshold probability, and the first wireless device 502 may report the NLOS probabilities and/or the path information for the first signal/beam path, the second signal/beam path, and the fourth signal/beam path (and exclude/skip measurement reporting for the third signal/beam path and the fifth signal/beam path).

In another example, the LOS probabilities for five signal/beam paths of a given resource may be calculated as shown by the Table 3 below:

TABLE 3

Example LOS probabilities for multiple signal/beam paths

| Path # | LOS Probability |
|---|---|
| First path | P1 = 0.4 |
| Second path | P2 = 0.25 |
| Third path | P3 = 0.05 |
| Fourth path | P4 = 0.1 |
| Fifth path | P5 = 0.2 |

If the threshold probability 506 is an LOS threshold probability and is configured to be 60% (e.g., NLOS threshold probability=0.6), the first wireless device 502 may be configured to add the LOS probabilities in a decreasing order starting from the highest LOS probability to the lowest LOS probability (e.g., in an order of P1, P2, P5, P4, P3) until the sum meets (or exceeds) the LOS threshold probability. For example, the first wireless device 502 may first add the LOS probability for the first path (P1) and the LOS probability for the second path (P2), and the first wireless device 502 may obtain a sum of 0.65 (P1+P2=0.65). As the current sum meets (or exceeds) the LOS threshold probability (0.6), the first wireless device 502 may stop the addition, and the first wireless device 502 may report the LOS probabilities and/or the path information for the first signal/beam path and the second signal/beam path, and the first wireless device 502 may exclude/skip measurement reporting for the third signal/beam path, the fourth signal/beam path, and the fifth signal/beam path.

In another aspect of the present disclosure, the first wireless device 502 may be configured to compute/calculate the LOS/NLOS probability for a first signal/beam path. If the LOS/NLOS probability for the first signal/beam path is greater than or equal to the threshold probability 506, the first wireless device 502 may report measurement(s) for additional signal/beam paths. For example, if the threshold probability 506 is an LOS threshold probability and is configured to be 35% (e.g., LOS threshold probability=0.35) and the LOS probability calculated for a first signal/beam path is 40% (0.4), the first wireless device 502 may report LOS probabilities and/or path information for additional signal/beam path(s), such as LOS probabilities and/or path information for a second signal/beam path and a third signal/beam path, etc. However, if the LOS probability calculated for the first signal/beam path is 30% (0.3), the first wireless device 502 may not report LOS probabilities and/or path information for additional signal/beam path(s). In some examples, such configuration may be beneficial for measurement reporting as it may enable a wireless device to conserve overhead resources (for measurement reporting). For example, if an LOS threshold probability is configured to be low (e.g., 0.4, 0.3, etc.) and the LOS probability calculated for the first signal/beam path does not meet the LOS threshold probability, then it is likely that the LOS threshold probability for additional signal/beam path(s) may also be low. Thus, by skipping measurement reporting for additional signal/beam paths when the first signal/beam path does not meet the LOS threshold probability, the number of measurement reports may be reduced. In some examples, depending on the implemented algorithm for processing at the LMF, the threshold probability may be adjusted depending on the choice of the algorithm.

In another example, or as an alternative, the first wireless device 502 may be configured to compute/calculate the LOS/NLOS probability for a first signal/beam path. Then, if the LOS/NLOS probability for the first signal/beam path is less than or equal to the threshold probability 506, the first wireless device 502 may report measurement(s) for additional signal/beam paths. For example, if the threshold probability 506 is an LOS threshold probability and is configured to be 70% (e.g., LOS threshold probability=0.7) and the LOS probability calculated for the first signal/beam path 510 is 40% (0.4), the first wireless device 502 may report LOS probabilities and/or path information for additional signal/beam path(s), such as LOS probabilities and/or path information for the second signal/beam path 512 and the N-th signal/beam path 514. However, if the LOS probability calculated for the first signal/beam path 510 is 80% (0.8), the first wireless device 502 may not report LOS probabilities and/or path information for additional signal/beam path(s). In some examples, such configuration may be beneficial for communication as it may enable a wireless device to include measurement reports for additional signal/beam paths when the LOS probability of the first signal/beam path does not meet the LOS threshold probability. In other words, the wireless device may be able to report other signal/beam path(s). In some examples, depending on the implemented algorithm for processing at the LMF, the threshold probability may be adjusted depending on the choice of the algorithm.

In another aspect of the present disclosure, at 526, the first wireless device 502 may further be configured to determine whether to report the LOS/NLOS probabilities and/or the path information for at least some of the signal/beam paths 522 based on one or more additional parameters/criteria, such as a timing error group (TEG) value, an RSRP, a timing, an angle, a phase, etc., associated with each signal/beam path. In other words, the first wireless device 502 may be configured to report measurements for multiple signal/beam paths when at least one additional criterial is satisfied, otherwise the first wireless device 502 may not report measurements for multiple signal/beam paths. For example, the first wireless device 502 may be configured to measure an RSRP for multiple signal/beam paths along with calculating the LOS/NLOS probabilities for the multiple signal/beam paths, and the first wireless device 502 may determine whether to report the LOS/NLOS probabilities and/or the path information for the multiple signal/beam paths based on whether the measured RSRPs for the multiple signal/beam paths exceed an RSRP threshold. If the measured RSRPs for the multiple signal/beam paths exceed the RSRP threshold, the first wireless device may report the LOS/NLOS probabilities and/or the path information for the multiple signal/beam paths. On the other hand, if the measured RSRPs for at least some of the multiple signal/beam paths do not exceed the RSRP threshold, the first wireless device 502 may not report the LOS/NLOS probabilities and/or the path information for the multiple signal/beam paths, or the first wireless device 502 may not report the LOS/NLOS probabilities and/or the path information for signal/beam paths that do not exceed the RSRP threshold (but may still report LOS/NLOS probabilities and/or the path information for signal/beam paths that exceed the RSRP threshold).

In another examples, different criteria and/or thresholds may be configured for different paths. For example, the first signal/beam path 510 may be configured with a first RSRP threshold, and the second signal/beam path 512 may be configured with a second RSRP threshold. Then, the first wireless device may report the LOS/NLOS probabilities and/or the path information for the first signal/beam path 510 and the second signal/beam path 512 if an RSRP measured for the first signal/beam path 510 exceeds the first RSRP threshold and the an RSRP measured for the second signal/beam path 512 exceeds the second RSRP threshold. However, if one of the signal/beam paths does not meet its corresponding threshold, then the first wireless device 502 may not report the LOS/NLOS probabilities and/or the path information for multiple signal/beam paths (e.g., the first signal/beam path 510 and the second signal/beam path 512), or the first wireless device 502 may not report the LOS/NLOS probabilities and/or the path information for signal/beam paths that do not exceed their corresponding RSRP thresholds (but may still report LOS/NLOS probabilities and/or the path information for signal/beam paths that exceed their corresponding RSRP thresholds).

In some examples, the threshold for additional criteria (e.g., the first RSRP threshold, the second RSRP threshold, etc.) may be configured for the first wireless device 502, such as via a signaling from the second wireless device 504 or another entity (e.g., an LMF). Based on the first wireless device 502's implementation and/or or a network configuration, the first wireless device 502 may also prioritize the criteria. For example, the first wireless device 502 may determine whether to prioritize RSRP, LOS/NLOS probability, or other metrics first for the measurement report. For example, a signal/beam path with an LOS/NLOS probability exceeding the threshold probability and an RSRP exceeding the RSRP threshold may be prioritized in a measurement report, whereas a signal/beam path without an LOS/NLOS probability exceeding the threshold probability or an RSRP exceeding the RSRP threshold may be excluded from the measurement report. In another example, the first wireless device 502 may be configured to report LOS/NLOS probabilities based on the additional criteria, such as in an increasing order or a decreasing order. For example, the first wireless device 502 may be configured to report LOS/NLOS probabilities for multiple signal/beam paths based on their measured RSRPs (e.g., in an order from a highest RSRP to a lowest RSRP).

Figure 6:
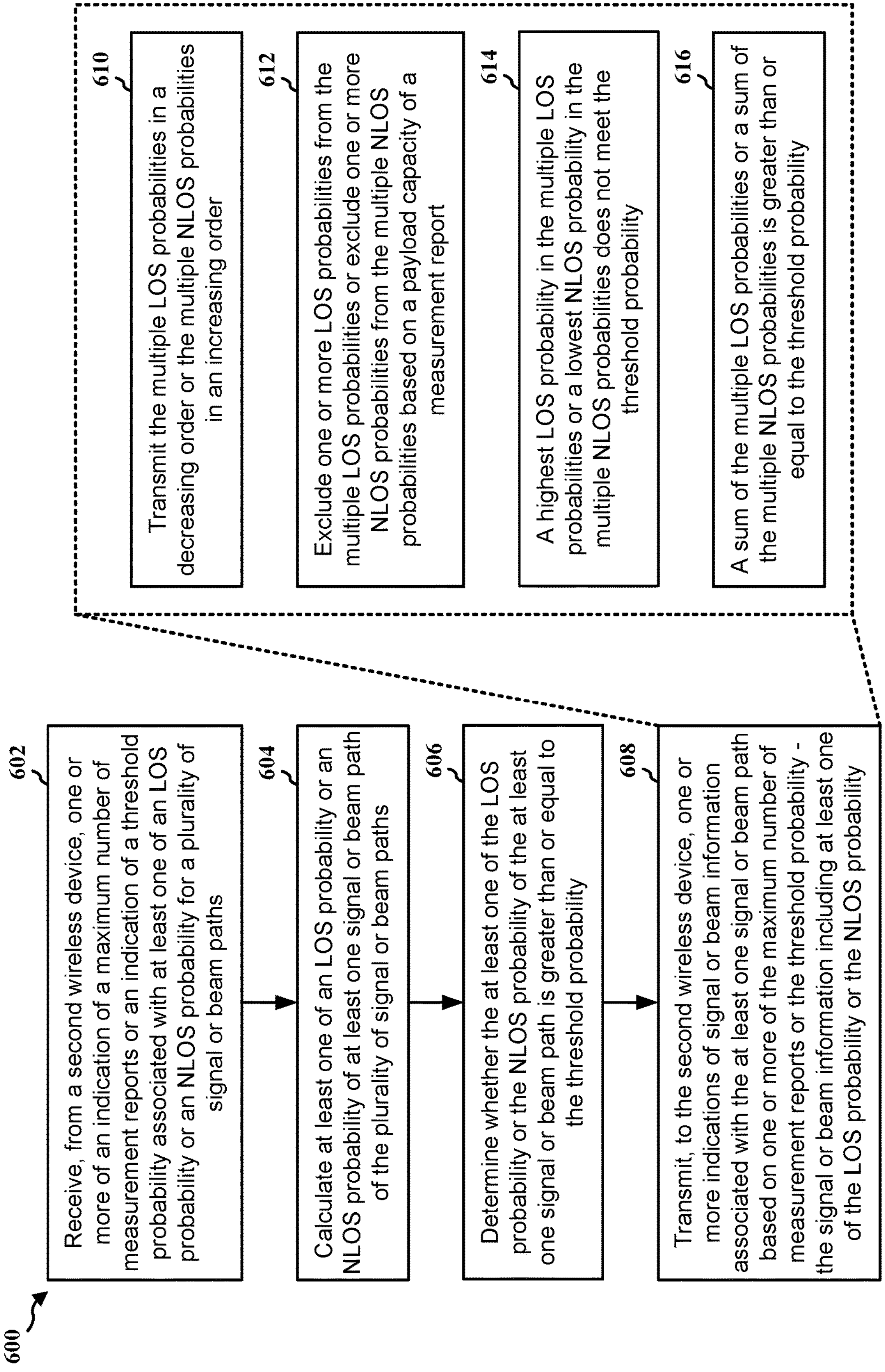
FIG. 6 is a flowchart of a method of wireless communication in accordance with aspects presented herein.

FIG. 6 is a flowchart 600 of a method of wireless communication. The method may be performed by a first wireless device or a component of a first wireless device (e.g., the UE 104, 350; the first wireless device 402, 502; the apparatus 802; a processing system, which may include the memory 360 and which may be the entire UE 350 or a component of the UE 350, such as the TX processor 368, the RX processor 356, and/or the controller/processor 359). The method may enable the first wireless device to calculate LOS and/or NLOS probability for some of arriving signal/beam paths, and to report the calculated LOS and/or NLOS probability for the some of the signal/beam paths and/or measurements associated with the signal/beam paths based at least in part on a threshold probability and/or a configured number of measurement report.

At 602, the first wireless device may receive, from a second wireless device, one or more of an indication of a maximum number of measurement reports or an indication of a threshold probability associated with at least one of an LOS probability or an NLOS probability for a plurality of signal or beam paths, such as described in connection with FIG. 5. For example, at 518, the first wireless device 502 may receive an indication 520 from the second wireless device 504, where the indication 520 may include a number of measurement reports or a threshold probability 506. The reception of the indication may be performed by, e.g., the threshold configuration component 840 and/or the reception component 830 of the apparatus 802 in FIG. 8.

In one example, the first wireless device may be a UE or a positioning reference device, and the second wireless device may be a network that corresponds to at least one of an LMF, a base station, or a TRP. In another example, the first wireless device may be a network that corresponds to at least one of an LMF, a base station, or a TRP, and the second wireless device may be a UE. In another example, both the first wireless device and the second wireless device may be UEs.

At 604, the first wireless device may calculate at least one of an LOS probability or an NLOS probability of at least one signal or beam path of the plurality of signal or beam paths, such as described in connection with FIG. 5. For example, at 524, the first wireless device 502 may calculate an LOS probability or an NLOS probability for at least some of the signal/beam paths 522. The calculation of the LOS/NLOS probability may be performed by, e.g., the LOS/NLOS probability calculation component 842 of the apparatus 802 in FIG. 8.

In one example, the at least one of the LOS probability or the NLOS probability may be calculated based on one or more PRSs or SRSs received from the second wireless device.

At 606, the first wireless device may determine whether the at least one of the LOS probability or the NLOS probability of the at least one signal or beam path is greater than or equal to the threshold probability, such as described in connection with FIG. 5. For example, at 530, the first wireless device 502 may determine whether an LOS/NLOS probability calculated for a path exceeds the threshold probability 506. The determination of whether the at least one of the LOS probability or the NLOS probability of the at least one signal or beam path is greater than or equal to the threshold probability may be performed by, e.g., the LOS/NLOS determination component 844 of the apparatus 802 in FIG. 8.

At 608, the first wireless device may transmit, to the second wireless device, one or more indications of signal or beam information associated with the at least one signal or beam path based on one or more of the maximum number of measurement reports or the threshold probability, the one or more indications of signal or beam information including at least one of the LOS probability or the NLOS probability, such as described in connection with FIG. 5. For example, at 526, the first wireless device 502 may transmit LOS/NLOS probability and/or path information for at least some of signal/beam path(s) 522 to the second wireless device 504. The transmission of the one or more indications may be performed by, e.g., the LOS/NLOS probability reporting component 846 and/or the transmission component 834 of the apparatus 802 in FIG. 8.

In one example, the one or more indications of signal or beam information may further include at least one of an angle, a timing, a phase, or a power associated with the at least one signal or beam path.

In another example, the one or more indications of signal or beam information may include multiple LOS probabilities or multiple NLOS probabilities that are associated with multiple signal or beam paths of the plurality of signal or beam paths, such as described in connection with 528 of FIG. 5. In such example, as shown at 610, the first wireless device may transmit the multiple LOS probabilities in a decreasing order or the multiple NLOS probabilities in an increasing order. In such example, as shown at 612, the first wireless device may exclude one or more LOS probabilities from the multiple LOS probabilities or exclude one or more NLOS probabilities from the multiple NLOS probabilities based on a payload capacity of a measurement report.

In another example, as shown at 614, a highest LOS probability in the multiple LOS probabilities or a lowest NLOS probability in the multiple NLOS probabilities may not meet the threshold probability, such as described in connection with 530 of FIG. 5.

In another example, as shown at 616, a sum of the multiple LOS probabilities or a sum of the multiple NLOS probabilities may be greater than or equal to the threshold probability, such as described in connection with 532 of FIG. 5.

In another example, the one or more indications of signal or beam information may include the LOS probability or the NLOS probability that is associated with a first signal or beam path of the plurality of signal or beam paths. In such an example, the one or more indications of signal or beam information may include at least a second LOS probability if the LOS probability does not meet the threshold probability, and the one or more indications of signal or beam information may not include LOS probabilities other than the LOS probability if the LOS probability meets the threshold probability. In such an example, the one or more indications of signal or beam information may include at least a second NLOS probability if the NLOS probability does not meet the threshold probability, and the one or more indications of signal or beam information may not include NLOS probabilities other than the NLOS probability if the NLOS probability meets the threshold probability.

In another example, the first wireless device may determine whether the at least one signal or beam path has a RSRP exceeding at least one RSRP threshold, and the one or more indications of signal or beam information may include the at least one of the LOS probability or the NLOS probability of the at least one signal or beam path that exceeds the at least one RSRP threshold. In such an example, the first wireless device may receive, from the second wireless device, a configuration for the at least one RSRP threshold.

In another example, the first wireless device may transmit the one or more indications of signal or beam information in an order that is based on a RSRP, the at least one of the LOS probability or the NLOS probability, an angle, a timing, a phase, or a power associated with the at least one signal or beam path.

Figure 7:
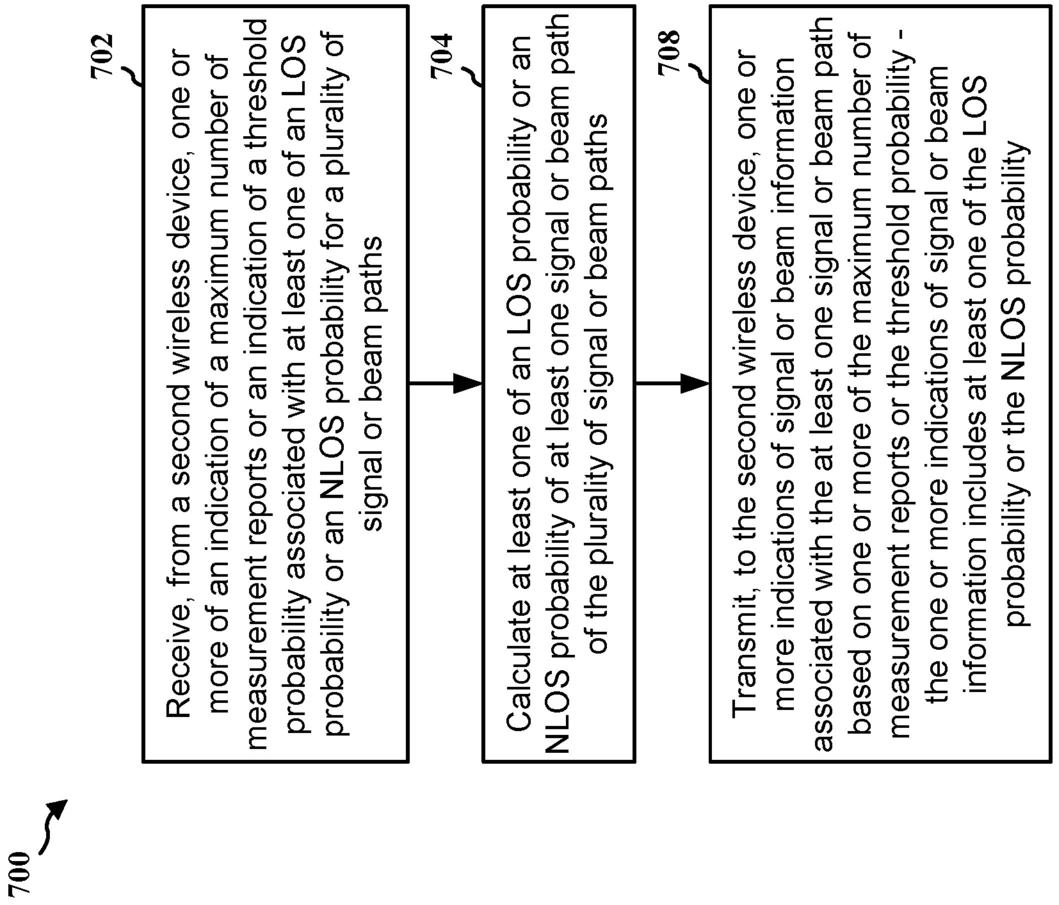
FIG. 7 is a flowchart of a method of wireless communication in accordance with aspects presented herein.

FIG. 7 is a flowchart 700 of a method of wireless communication. The method may be performed by a first wireless device or a component of a first wireless device (e.g., the UE 104, 350; the first wireless device 402, 502; the apparatus 802; a processing system, which may include the memory 360 and which may be the entire UE 350 or a component of the UE 350, such as the TX processor 368, the RX processor 356, and/or the controller/processor 359). The method may enable the first wireless device to calculate LOS and/or NLOS probability for some of arriving signal/beam paths, and to report the calculated LOS and/or NLOS probability for the some of the signal/beam paths and/or measurements associated with the signal/beam paths based at least in part on a threshold probability and/or a configured number of measurement report.

At 702, the first wireless device may receive, from a second wireless device, one or more of an indication of a maximum number of measurement reports or an indication of a threshold probability associated with at least one of an LOS probability or an NLOS probability for a plurality of signal or beam paths, such as described in connection with FIG. 5. For example, at 518, the first wireless device 502 may receive an indication 520 from the second wireless device 504, where the indication 520 may include a number of measurement reports or a threshold probability 506. The reception of the indication may be performed by, e.g., the threshold configuration component 840 and/or the reception component 830 of the apparatus 802 in FIG. 8.

In one example, the first wireless device may be a UE or a positioning reference device, and the second wireless device may be a network that corresponds to at least one of an LMF, a base station, or a TRP. In another example, the first wireless device may be a UE or a network that corresponds to at least one of an LMF, a base station, or a TRP, and the second wireless device may be a UE.

At 704, the first wireless device may calculate at least one of an LOS probability or an NLOS probability of at least one signal or beam path of the plurality of signal or beam paths, such as described in connection with FIG. 5. For example, at 524, the first wireless device 502 may calculate an LOS probability or an NLOS probability for at least some of the signal/beam paths 522. The calculation of the LOS/NLOS probability may be performed by, e.g., the LOS/NLOS probability calculation component 842 of the apparatus 802 in FIG. 8.

In one example, the at least one of the LOS probability or the NLOS probability may be calculated based on one or more PRSs or SRSs received from the second wireless device.

In another example, the first wireless device may determine whether the at least one of the LOS probability or the NLOS probability of the at least one signal or beam path is greater than or equal to the threshold probability, such as described in connection with FIG. 5. For example, at 530, the first wireless device 502 may determine whether an LOS/NLOS probability calculated for a path exceeds the threshold probability 506. The determination of whether the at least one of the LOS probability or the NLOS probability of the at least one signal or beam path is greater than or equal to the threshold probability may be performed by, e.g., the LOS/NLOS determination component 844 of the apparatus 802 in FIG. 8.

At 708, the first wireless device may transmit, to the second wireless device, one or more indications of signal or beam information associated with the at least one signal or beam path based on one or more of the maximum number of measurement reports or the threshold probability, the one or more indications of signal or beam information including at least one of the LOS probability or the NLOS probability, such as described in connection with FIG. 5. For example, at 526, the first wireless device 502 may transmit LOS/NLOS probability and/or path information for at least some of signal/beam path(s) 522 to the second wireless device 504. The transmission of the one or more indications may be performed by, e.g., the LOS/NLOS probability reporting component 846 and/or the transmission component 834 of the apparatus 802 in FIG. 8.

In one example, the one or more indications of signal or beam information may further include at least one of an angle, a timing, a phase, or a power associated with the at least one signal or beam path.

In another example, the one or more indications of signal or beam information may include multiple LOS probabilities or multiple NLOS probabilities that are associated with multiple signal or beam paths of the plurality of signal or beam paths, such as described in connection with 528 of FIG. 5. In such example, the first wireless device may transmit the multiple LOS probabilities in a decreasing order or the multiple NLOS probabilities in an increasing order. In such example, the first wireless device may exclude one or more LOS probabilities from the multiple LOS probabilities or exclude one or more NLOS probabilities from the multiple NLOS probabilities based on a payload capacity of a measurement report.

In another example, a highest LOS probability in the multiple LOS probabilities or a lowest NLOS probability in the multiple NLOS probabilities may not meet the threshold probability, such as described in connection with 530 of FIG. 5.

In another example, a sum of the multiple LOS probabilities or a sum of the multiple NLOS probabilities may be greater than or equal to the threshold probability, such as described in connection with 532 of FIG. 5.

In another example, the one or more indications of signal or beam information may include the LOS probability or the NLOS probability that is associated with a first signal or beam path of the plurality of signal or beam paths. In such an example, the one or more indications of signal or beam information may include at least a second LOS probability if the LOS probability does not meet the threshold probability, and the one or more indications of signal or beam information may not include LOS probabilities other than the LOS probability if the LOS probability meets the threshold probability. In such an example, the one or more indications of signal or beam information may include at least a second NLOS probability if the NLOS probability does not meet the threshold probability, and the one or more indications of signal or beam information may not include NLOS probabilities other than the NLOS probability if the NLOS probability meets the threshold probability.

In another example, the first wireless device may determine whether the at least one signal or beam path has a RSRP exceeding at least one RSRP threshold, and the one or more indications of signal or beam information may include the at least one of the LOS probability or the NLOS probability of the at least one signal or beam path that exceeds the at least one RSRP threshold. In such an example, the first wireless device may receive, from the second wireless device, a configuration for the at least one RSRP threshold.

In another example, the first wireless device may transmit the one or more indications of signal or beam information in an order that is based on a RSRP, the at least one of the LOS probability or the NLOS probability, an angle, a timing, a phase, or a power associated with the at least one signal or beam path.

Figure 8:
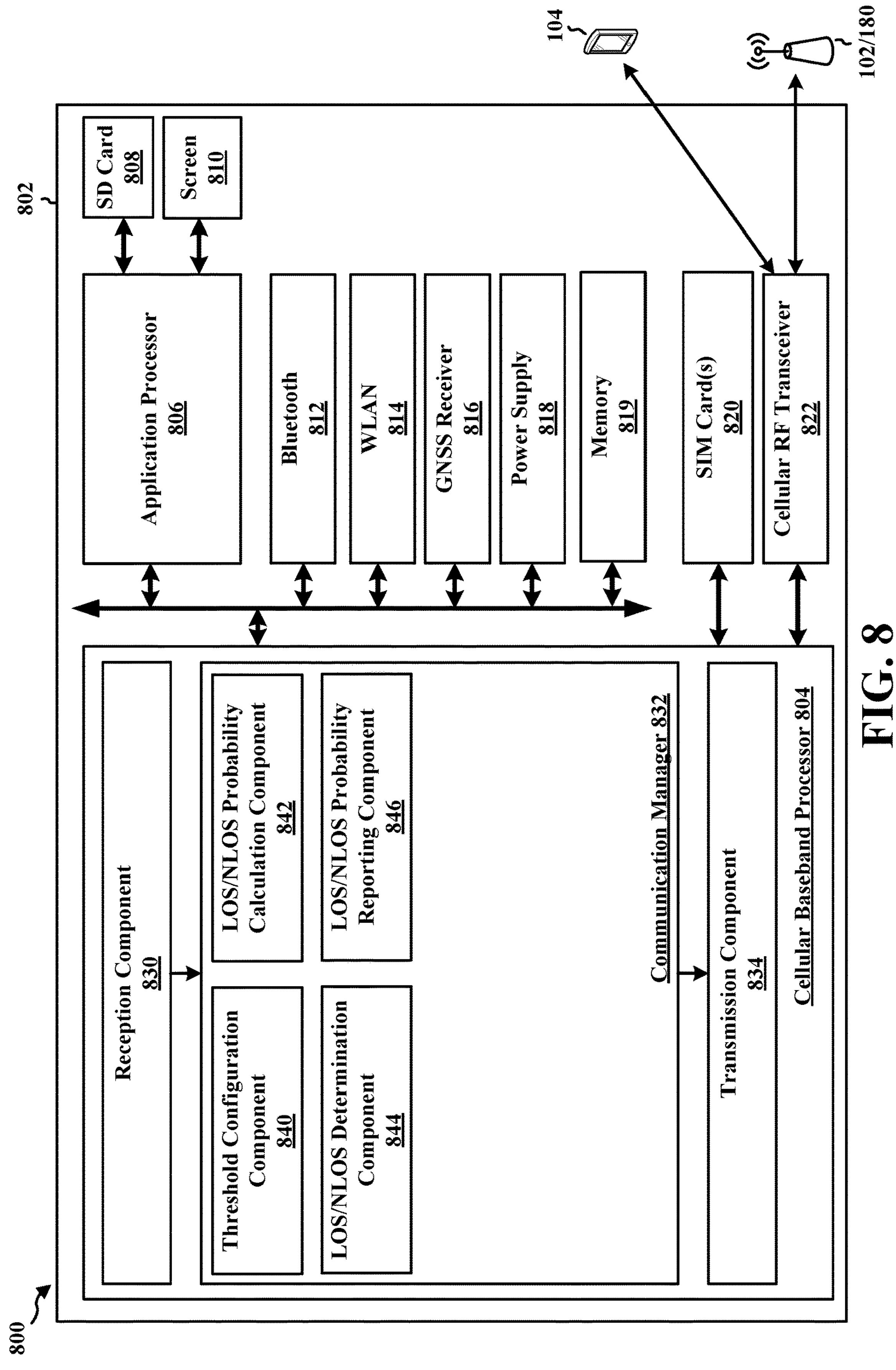
FIG. 8 is a diagram illustrating an example of a hardware implementation for an example apparatus in accordance with aspects presented herein.

FIG. 8 is a diagram 800 illustrating an example of a hardware implementation for an apparatus 802. In some examples, the apparatus 802 may be a UE, a component of a UE, or may implement UE functionality. In other examples, the apparatus 802 may be a network, a component of a network, or may implement network functionality. In some aspects, the apparatus 802 may include a cellular baseband processor 804 (also referred to as a modem) coupled to a cellular RF transceiver 822. In some aspects, the apparatus 802 may further include one or more subscriber identity modules (SIM) cards 820, an application processor 806 coupled to a secure digital (SD) card 808 and a screen 810, a Bluetooth module 812, a wireless local area network (WLAN) module 814, a GNSS receiver module 816, a power supply 818, or a memory 819. The cellular baseband processor 804 communicates through the cellular RF transceiver 822 with the UE 104 and/or BS 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the baseband processor 804, and in another configuration, the apparatus 802 may be the entire UE (e.g., see 350 of FIG. 3) and include the additional modules of the apparatus 802.

The communication manager 832 includes a threshold configuration component 840 that is configured to receive, from a second wireless device, one or more of an indication of a maximum number of measurement reports or an indication of a threshold probability associated with at least one of an LOS probability or an NLOS probability for a plurality of signal or beam paths, e.g., as described in connection with 602 of FIGS. 6 and/or 702 of FIG. 7. The communication manager 832 further includes an LOS/NLOS probability calculation component 842 that is configured to calculate at least one of an LOS probability or an NLOS probability of at least one signal or beam path of the plurality of signal or beam paths, e.g., as described in connection with 604 of FIGS. 6 and/or 704 of FIG. 7. The communication manager 832 further includes an LOS/NLOS determination component 844 that is configured to determine whether the at least one of the LOS probability or the NLOS probability of the at least one signal or beam path is greater than or equal to the threshold probability, e.g., as described in connection with 606 of FIG. 6. The communication manager 832 further includes an LOS/NLOS probability reporting component 846 that is configured to transmit, to the second wireless device, one or more indications of signal or beam information associated with the at least one signal or beam path based on one or more of the maximum number of measurement reports or the threshold probability, the one or more indications of signal or beam information including at least one of the LOS probability or the NLOS probability, e.g., as described in connection with 608 of FIGS. 6 and/or 708 of FIG. 7.

The apparatus may include additional components that perform each of the blocks of the algorithm in the flowcharts of FIGS. 6 and 7. As such, each block in the flowcharts of FIGS. 6 and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 802 may include a variety of components configured for various functions. In one configuration, the apparatus 802, and in particular the cellular baseband processor 804, includes means for receiving, from a second wireless device, one or more of an indication of a maximum number of measurement reports or an indication of a threshold probability associated with at least one of an LOS probability or an NLOS probability for a plurality of signal or beam paths (e.g., the threshold configuration component 840 and/or the reception component 830). The apparatus 802 includes means for calculating at least one of an LOS probability or an NLOS probability of at least one signal or beam path of the plurality of signal or beam paths (e.g., the LOS/NLOS probability calculation component 842). The apparatus 802 includes means for determining whether the at least one of the LOS probability or the NLOS probability of the at least one signal or beam path is greater than or equal to the threshold probability (e.g., the LOS/NLOS determination component 844). The apparatus 802 includes means for transmitting, to the second wireless device, one or more indications of signal or beam information associated with the at least one signal or beam path based on one or more of the maximum number of measurement reports or the threshold probability, the one or more indications of signal or beam information including at least one of the LOS probability or the NLOS probability (e.g., the LOS/NLOS probability reporting component 846 and/or the transmission component 834).

In one configuration, the first wireless device may be a UE or a positioning reference device, and the second wireless device may be a network that corresponds to at least one of an LMF, a base station, or a TRP. In another configuration, the first wireless device may be a UE or a network that corresponds to at least one of an LMF, a base station, or a TRP, and the second wireless device may be a UE.

In one configuration, the at least one of the LOS probability or the NLOS probability may be calculated based on one or more PRSs or SRSs received from the second wireless device.

In one configuration, the one or more indications of signal or beam information may further include at least one of an angle, a timing, a phase, or a power associated with the at least one signal or beam path.

In another configuration, the one or more indications of signal or beam information may include multiple LOS probabilities or multiple NLOS probabilities that are associated with multiple signal or beam paths of the plurality of signal or beam paths, such as described in connection with 528 of FIG. 5. In such a configuration, the first wireless device may transmit the multiple LOS probabilities in a decreasing order or the multiple NLOS probabilities in an increasing order. In such a configuration, the first wireless device may exclude one or more LOS probabilities from the multiple LOS probabilities or exclude one or more NLOS probabilities from the multiple NLOS probabilities based on a payload capacity of a measurement report.

In another configuration, a highest LOS probability in the multiple LOS probabilities or a lowest NLOS probability in the multiple NLOS probabilities may not meet the threshold probability.

In another configuration, a sum of the multiple LOS probabilities or a sum of the multiple NLOS probabilities may be greater than or equal to the threshold probability.

In another configuration, the one or more indications of signal or beam information may include the LOS probability or the NLOS probability that is associated with a first signal or beam path of the plurality of signal or beam paths. In such a configuration, the one or more indications of signal or beam information may include at least a second LOS probability if the LOS probability does not meet the threshold probability, and the one or more indications of signal or beam information may not include LOS probabilities other than the LOS probability if the LOS probability meets the threshold probability. In such a configuration, the one or more indications of signal or beam information may include at least a second NLOS probability if the NLOS probability does not meet the threshold probability, and the one or more indications of signal or beam information may not include NLOS probabilities other than the NLOS probability if the NLOS probability meets the threshold probability.

In another configuration, apparatus 802 may include means for determining whether the at least one signal or beam path has a RSRP exceeding at least one RSRP threshold, and the one or more indications of signal or beam information may include the at least one of the LOS probability or the NLOS probability of the at least one signal or beam path that exceeds the at least one RSRP threshold. In such a configuration, the apparatus 802 may include means for receiving, from the second wireless device, a configuration for the at least one RSRP threshold.

In another configuration, the apparatus 802 includes means for transmitting the one or more indications of signal or beam information in an order that is based on a RSRP, the at least one of the LOS probability or the NLOS probability, an angle, a timing, a phase, or a power associated with the at least one signal or beam path.

The means may be one or more of the components of the apparatus 802 configured to perform the functions recited by the means. As described supra, the apparatus 802 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 9:
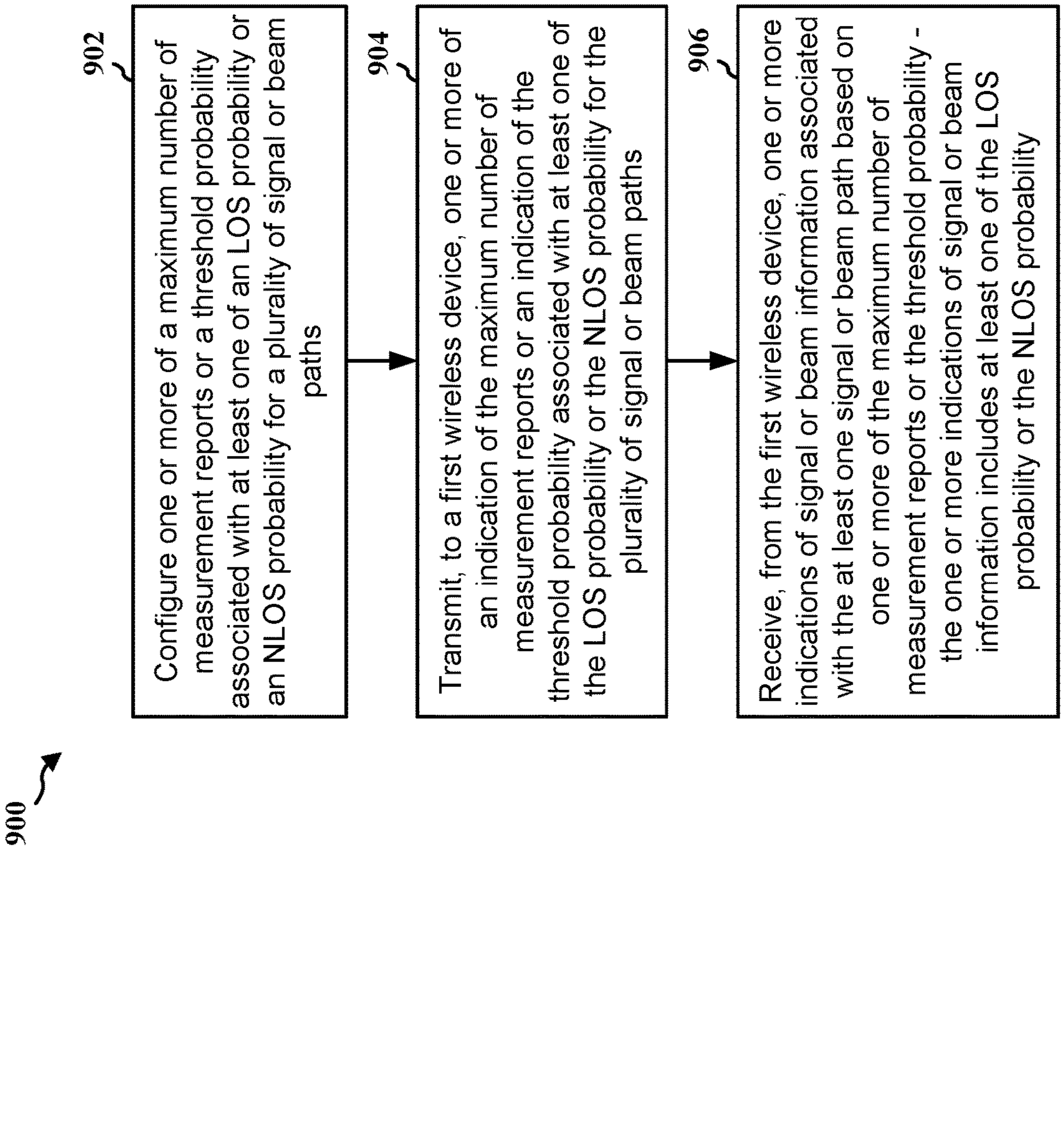
FIG. 9 is a flowchart of a method of wireless communication in accordance with aspects presented herein.

FIG. 9 is a flowchart 900 of a method of wireless communication. The method may be performed by a second wireless device or a component of a second wireless device (e.g., the base station 102, 180, 310; the second wireless device 404, 504; the apparatus 1002; a processing system, which may include the memory 376 and which may be the entire base station 310 or a component of the base station 310, such as the TX processor 316 the RX processor 370, and/or the controller/processor 375). The method may enable the second wireless device to configure a first wireless device with a threshold probability and/or a number of measurement report, such that the second wireless device may receive LOS/NLOS probabilities and/or path information for one or more signal/beam paths from the first wireless device based at least in part on the threshold probability and/or the number of measurement report.

At 902, the second wireless device may configure one or more of a maximum number of measurement reports or a threshold probability associated with at least one of an LOS probability or an NLOS probability for a plurality of signal or beam paths, such as described in connection with FIG. 5. For example, at 508, the second wireless device 504 may configure a number of measurement reports or a threshold probability 506 associated with an LOS probability or an NLOS probability for multiple signal or beam paths 522. The configuration of the one or more of a maximum number of measurement reports or a threshold probability may be performed by, e.g., the threshold configuration component 1040 of the apparatus 1002 in FIG. 10.

At 904, the second wireless device may transmit, to a first wireless device, one or more of an indication of the maximum number of measurement reports or an indication of the threshold probability associated with at least one of the LOS probability or the NLOS probability for the plurality of signal or beam paths, such as described in connection with FIG. 5. For example, at 518, the second wireless device 504 may transmit an indication 520 to the first wireless device 502 indicating a number of measurement reports and/or a threshold probability 506. The transmission of the one or more of an indication of the maximum number of measurement reports or an indication of the threshold probability may be performed by, e.g., the threshold indication component 1042 and/or the transmission component 1034 of the apparatus 1002 in FIG. 10.

In one example, the first wireless device may be a UE or a positioning reference device, and the second wireless device may be a network that corresponds to at least one of an LMF, a base station, or a TRP. In another example, the first wireless device may be a UE or a network that corresponds to at least one of an LMF, a base station, or a TRP, and the second wireless device may also be a UE.

At 906, the second wireless device may receive, from the first wireless device, one or more indications of signal or beam information associated with the at least one signal or beam path based on one or more of the maximum number of measurement reports or the threshold probability, the one or more indications of signal or beam information including at least one of the LOS probability or the NLOS probability, such as described in connection with FIG. 5. For example, at 526, the second wireless device 504 may receive LOS/NLOS probability and/or path information for at least some of signal/beam path(s) 522 from the first wireless device 502 based at least in part on the number of measurement reports and/or the threshold probability 506. The reception of the one or more indications may be performed by, e.g., the measurement report process component 1044 and/or the reception component 1030 of the apparatus 1002 in FIG. 10.

In one example, the one or more indications of signal or beam information may further include at least one of an angle, a timing, a phase, or a power associated with the at least one signal or beam path.

In another example, the one or more indications of signal or beam information may include multiple LOS probabilities or multiple NLOS probabilities that are associated with multiple signal or beam paths of the plurality of signal or beam paths. In such an example, the second wireless device may receive the multiple LOS probabilities in a decreasing order or the multiple NLOS probabilities in an increasing order, such as described in connection with 528 of FIG. 5.

In another example, a highest LOS probability in the multiple LOS probabilities or a lowest NLOS probability in the multiple NLOS probabilities may not meet the threshold probability, such as described in connection with 530 of FIG. 5.

In another example, a sum of the multiple LOS probabilities or a sum of the multiple NLOS probabilities is greater than or equal to the threshold probability, such as described in connection with 532 of FIG. 5.

In another example, the one or more indications of signal or beam information may include the LOS probability or the NLOS probability that is associated with a first signal or beam path of the plurality of signal or beam paths. In such an example, the one or more indications of signal or beam information may include at least a second LOS probability if the LOS probability does not meet the threshold probability, and the one or more indications of signal or beam information may not include LOS probabilities other than the LOS probability if the LOS probability meets the threshold probability. In such an example, the one or more indications of signal or beam information may include at least a second NLOS probability if the NLOS probability does not meet the threshold probability, and the one or more indications of signal or beam information may not include NLOS probabilities other than the NLOS probability if the NLOS probability meets the threshold probability.

In another example, the second wireless device may transmit, to the first wireless device, a configuration for at least one RSRP threshold, and the one or more indications of signal or beam information may include the at least one of the LOS probability or the NLOS probability of the at least one signal or beam path that exceeds the at least one RSRP threshold.

In another example, the second wireless device may receive the one or more indications of signal or beam information in an order that is based on a RSRP, the at least one of the LOS probability or the NLOS probability, an angle, a timing, a phase, or a power associated with the at least one signal or beam path.

Figure 10:
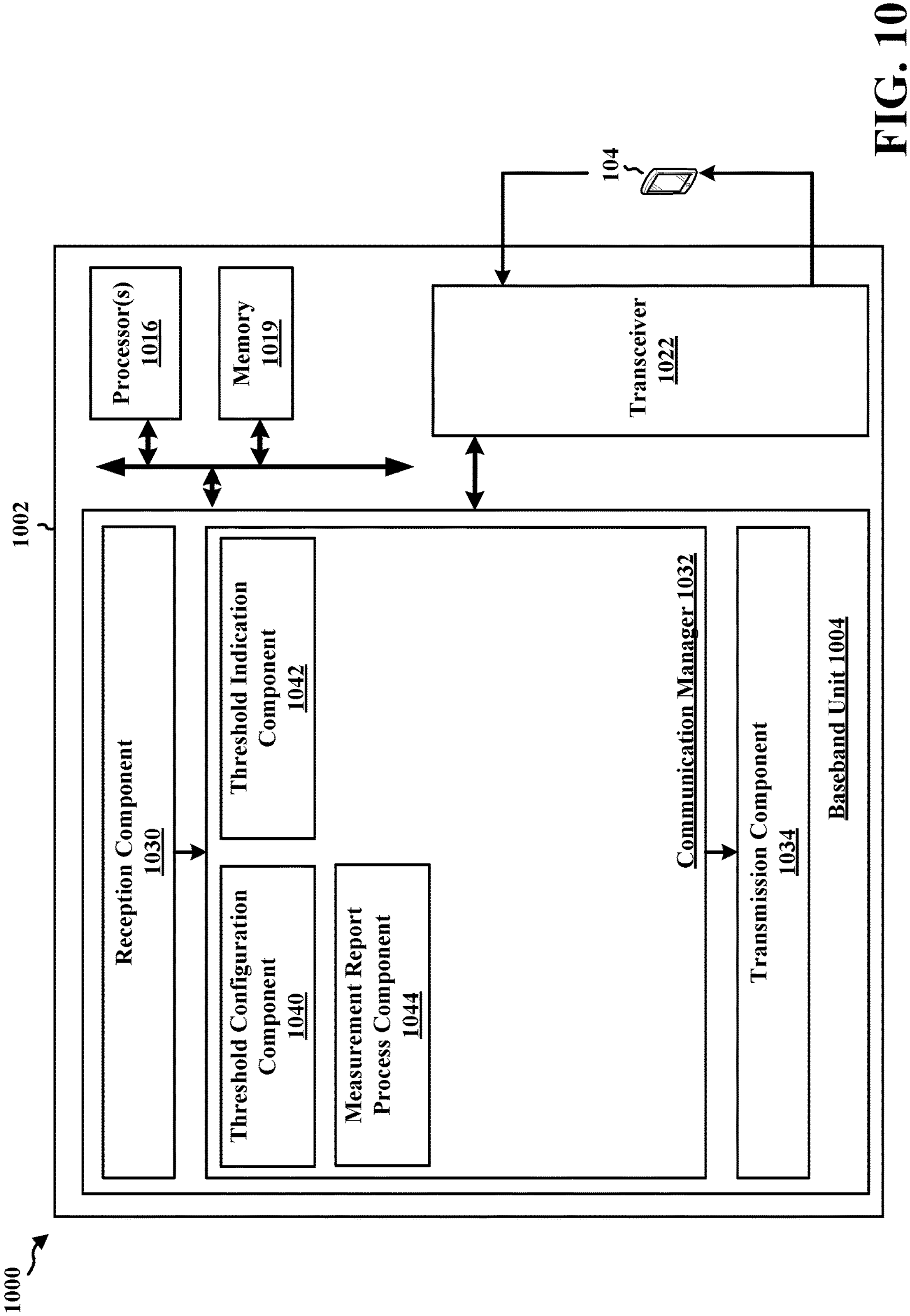
FIG. 10 is a diagram illustrating an example of a hardware implementation for an example apparatus in accordance with aspects presented herein.

FIG. 10 is a diagram 1000 illustrating an example of a hardware implementation for an apparatus 1002. In some examples, the apparatus 1002 may be a network that corresponds to a base station, a TRP or an LMF, or a component of a network entity, or may implement base station/network entity functionality. In other examples, the apparatus 1002 may be a UE, a component of a UE, or may implement UE functionality. In some aspects, the apparatus 1002 may include a baseband unit 1004. The baseband unit 1004 may communicate through a transceiver 1022 (e.g., a cellular RF transceiver) with the UE 104. In some aspects, the apparatus 1002 may further include one or more processors 1016 and a memory 1019. For example, the baseband unit 1004 may include a computer-readable medium/memory that is coupled to the one or more processors 1016 and/or the transceiver 1022. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the base station 310 and may include the memory 376 and/or at least one of the TX processor 316, the RX processor 370, and the controller/processor 375.

The communication manager 1032 includes a threshold configuration component 1040 that configures one or more of a maximum number of measurement reports or a threshold probability associated with at least one of an LOS probability or an NLOS probability for a plurality of signal or beam paths, e.g., as described in connection with 902 of FIG. 9. The communication manager 1032 includes a threshold indication component 1042 that transmits, to a first wireless device, one or more of an indication of the maximum number of measurement reports or an indication of the threshold probability associated with at least one of the LOS probability or the NLOS probability for the plurality of signal or beam paths, e.g., as described in connection with 904 of FIG. 9. The communication manager 1032 further includes a measurement report process component 1044 that receives, from the first wireless device, one or more indications of signal or beam information associated with the at least one signal or beam path based on one or more of the maximum number of measurement reports or the threshold probability, the one or more indications of signal or beam information including at least one of the LOS probability or the NLOS probability, e.g., as described in connection with 906 of FIG. 9.

The apparatus may include additional components that perform each of the blocks of the algorithm in the flowchart of FIG. 9. As such, each block in the flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1002 may include a variety of components configured for various functions. In one configuration, the apparatus 1002, and in particular the baseband unit 1004, includes means for configuring one or more of a maximum number of measurement reports or a threshold probability associated with at least one of an LOS probability or an NLOS probability for a plurality of signal or beam paths (e.g., the threshold configuration component 1040). The apparatus 1002 includes means for transmitting, to a first wireless device, one or more of an indication of the maximum number of measurement reports or an indication of the threshold probability associated with at least one of the LOS probability or the NLOS probability for the plurality of signal or beam paths (e.g., the threshold indication component 1042 and/or the transmission component 1034). The apparatus 1002 includes means for receiving, from the first wireless device, one or more indications of signal or beam information associated with the at least one signal or beam path based on one or more of the maximum number of measurement reports or the threshold probability, the one or more indications of signal or beam information including at least one of the LOS probability or the NLOS probability (e.g., the measurement report process component 1044 and/or the reception component 1030).

In one configuration, the first wireless device may be a UE or a positioning reference device, and the second wireless device may be a network that corresponds to at least one of an LMF, a base station, or a TRP. In another configuration, the first wireless device may be a network that corresponds to at least one of an LMF, a base station, or a TRP, and the second wireless device may be a UE. In another configuration, the first wireless device may be a first UE and the second wireless device may be a second UE, such as for sidelink communications between two UEs.

In one configuration, the one or more indications of signal or beam information may further include at least one of an angle, a timing, a phase, or a power associated with the at least one signal or beam path.

In another configuration, the one or more indications of signal or beam information may include multiple LOS probabilities or multiple NLOS probabilities that are associated with multiple signal or beam paths of the plurality of signal or beam paths. In such a configuration, the second wireless device may receive the multiple LOS probabilities in a decreasing order or the multiple NLOS probabilities in an increasing order.

In another configuration, a highest LOS probability in the multiple LOS probabilities or a lowest NLOS probability in the multiple NLOS probabilities may not meet the threshold probability.

In another configuration, a sum of the multiple LOS probabilities or a sum of the multiple NLOS probabilities is greater than or equal to the threshold probability.

In another configuration, the one or more indications of signal or beam information may include the LOS probability or the NLOS probability that is associated with a first signal or beam path of the plurality of signal or beam paths. In such a configuration, the one or more indications of signal or beam information may include at least a second LOS probability if the LOS probability does not meet the threshold probability, and the one or more indications of signal or beam information may not include LOS probabilities other than the LOS probability if the LOS probability meets the threshold probability. In such a configuration, the one or more indications of signal or beam information may include at least a second NLOS probability if the NLOS probability does not meet the threshold probability, and the one or more indications of signal or beam information may not include NLOS probabilities other than the NLOS probability if the NLOS probability meets the threshold probability.

In another configuration, the second wireless device may transmit, to the first wireless device, a configuration for at least one RSRP threshold, and the one or more indications of signal or beam information may include the at least one of the LOS probability or the NLOS probability of the at least one signal or beam path that exceeds the at least one RSRP threshold.

In another configuration, the second wireless device may receive the one or more indications of signal or beam information in an order that is based on a RSRP, the at least one of the LOS probability or the NLOS probability, an angle, a timing, a phase, or a power associated with the at least one signal or beam path.

The means may be one or more of the components of the apparatus 1002 configured to perform the functions recited by the means. As described supra, the apparatus 1002 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to receive, from a second wireless device, one or more of an indication of a maximum number of measurement reports or an indication of a threshold probability associated with at least one of an LOS probability or an NLOS probability for a plurality of signal or beam paths; calculate at least one of an LOS probability or an NLOS probability of at least one signal or beam path of the plurality of signal or beam paths; and transmit, to the second wireless device, one or more indications of signal or beam information associated with the at least one signal or beam path based on one or more of the maximum number of measurement reports or the threshold probability, the one or more indications of signal or beam information including at least one of the LOS probability or the NLOS probability.

Aspect 2 is the apparatus of aspect 1, further including a transceiver coupled to the at least one processor.

Aspect 3 is the apparatus of any of aspects 1 and 2, where the first wireless device is a UE or a positioning reference device, and where the second wireless device is a network that corresponds to at least one of an LMF, a base station, or a TRP.

Aspect 4 is the apparatus of any of aspects 1 to 3, where the first wireless device is a UE or a network that corresponds to at least one of an LMF, a base station, or a TRP, and where the second wireless device is a UE.

Aspect 5 is the apparatus of any of aspects 1 to 4, where the at least one of the LOS probability or the NLOS probability is calculated based on one or more PRSs or SRSs received from the second wireless device.

Aspect 6 is the apparatus of any of aspects 1 to 5, where the one or more indications of signal or beam information further includes at least one of an angle, a timing, a phase, or a power associated with the at least one signal or beam path.

Aspect 7 is the apparatus of any of aspects 1 to 6, where the at least one processor is further configured to: determine whether the at least one of the LOS probability or the NLOS probability of the at least one signal or beam path is greater than or equal to the threshold probability.

Aspect 8 is the apparatus of any of aspects 1 to 7, where the one or more indications of signal or beam information includes multiple LOS probabilities or multiple NLOS probabilities that are associated with multiple signal or beam paths of the plurality of signal or beam paths.

Aspect 9 is the apparatus of any of aspects 1 to 8, where to transmit the one or more indications of signal or beam information associated with the at least one signal or beam path, the at least one processor is further configured to: transmit the multiple LOS probabilities in a decreasing order or the multiple NLOS probabilities in an increasing order.

Aspect 10 is the apparatus of any of aspects 1 to 9, where to transmit the one or more indications of signal or beam information associated with the at least one signal or beam path, the at least one processor is further configured to: exclude one or more LOS probabilities from the multiple LOS probabilities or exclude one or more NLOS probabilities from the multiple NLOS probabilities based on a payload capacity of a measurement report.

Aspect 11 is the apparatus of any of aspects 1 to 10, where a highest LOS probability in the multiple LOS probabilities or a lowest NLOS probability in the multiple NLOS probabilities does not meet the threshold probability.

Aspect 12 is the apparatus of any of aspects 1 to 11, where a sum of the multiple LOS probabilities or a sum of the multiple NLOS probabilities is greater than or equal to the threshold probability.

Aspect 13 is the apparatus of any of aspects 1 to 12, where the one or more indications of signal or beam information includes at least a second LOS probability if the LOS probability does not meet the threshold probability, and where the one or more indications of signal or beam information does not include LOS probabilities other than the LOS probability if the LOS probability meets the threshold probability.

Aspect 14 is the apparatus of any of aspects 1 to 13, where the one or more indications of signal or beam information includes at least a second NLOS probability if the NLOS probability does not meet the threshold probability, and where the one or more indications of signal or beam information does not include NLOS probabilities other than the NLOS probability if the NLOS probability meets the threshold probability.

Aspect 15 is the apparatus of any of aspects 1 to 14, where the at least one processor is further configured to: determine whether the at least one signal or beam path has a RSRP exceeding at least one RSRP threshold, and where the one or more indications of signal or beam information includes the at least one of the LOS probability or the NLOS probability of the at least one signal or beam path that exceeds the at least one RSRP threshold.

Aspect 16 is the apparatus of any of aspects 1 to 15, where the at least one processor is further configured to: receive, from the second wireless device, a configuration for the at least one RSRP threshold.

Aspect 17 is the apparatus of any of aspects 1 to 16, where to transmit the one or more indications of signal or beam information associated with the at least one signal or beam path, the at least one processor is further configured to: transmit the one or more indications of signal or beam information in an order that is based on a RSRP, the at least one of the LOS probability or the NLOS probability, an angle, a timing, a phase, or a power associated with the at least one signal or beam path.

Aspect 18 is a method of wireless communication for implementing any of aspects 1 to 11.

Aspect 19 is an apparatus for wireless communication including means for implementing any of aspects 1 to 17.

Aspect 20 is a computer-readable medium storing computer executable code, where the code when executed by a processor causes the processor to implement any of aspects 1 to 17.

Aspect 21 is an apparatus for wireless communication including at least one processor coupled to a memory and configured to configure one or more of a maximum number of measurement reports or a threshold probability associated with at least one of an LOS probability or an NLOS probability for a plurality of signal or beam paths; transmit, to a first wireless device, one or more of an indication of the maximum number of measurement reports or an indication of the threshold probability associated with at least one of the LOS probability or the NLOS probability for the plurality of signal or beam paths; and receive, from the first wireless device, one or more indications of signal or beam information associated with the at least one signal or beam path based on one or more of the maximum number of measurement reports or the threshold probability, the one or more indications of signal or beam information including at least one of the LOS probability or the NLOS probability.

Aspect 22 is the apparatus of aspect 21, further including a transceiver coupled to the at least one processor.

Aspect 23 is the apparatus of any of aspects 21 and 22, where the first wireless device is a UE or a positioning reference device, and where the second wireless device is a network that corresponds to at least one of an LMF, a base station, or a TRP.

Aspect 24 is the apparatus of any of aspects 21 to 23, where the first wireless device is a UE or a network that corresponds to at least one of an LMF, a base station, or a TRP, and where the second wireless device is a UE.

Aspect 25 is the apparatus of any of aspects 21 to 24, where the one or more indications of signal or beam information further includes at least one of an angle, a timing, a phase, or a power associated with the at least one signal or beam path.

Aspect 26 is the apparatus of any of aspects 21 to 25, where the one or more indications of signal or beam information includes multiple LOS probabilities or multiple NLOS probabilities that are associated with multiple signal or beam paths of the plurality of signal or beam paths.

Aspect 27 is the apparatus of any of aspects 21 to 26, where to receive the one or more indications of signal or beam information associated with the at least one signal or beam path, the at least one processor is further configured to: receive the multiple LOS probabilities in a decreasing order or the multiple NLOS probabilities in an increasing order.

Aspect 28 is the apparatus of any of aspects 21 to 27, where a highest LOS probability in the multiple LOS probabilities or a lowest NLOS probability in the multiple NLOS probabilities does not meet the threshold probability.

Aspect 29 is the apparatus of any of aspects 21 to 28, where a sum of the multiple LOS probabilities or a sum of the multiple NLOS probabilities is greater than or equal to the threshold probability.

Aspect 30 is the apparatus of any of aspects 21 to 29, where the one or more indications of signal or beam information includes the LOS probability or the NLOS probability that is associated with a first signal or beam path of the plurality of signal or beam paths.

Aspect 31 is the apparatus of any of aspects 21 to 30, where the one or more indications of signal or beam information includes at least a second LOS probability if the LOS probability does not meet the threshold probability, and where the one or more indications of signal or beam information does not include LOS probabilities other than the LOS probability if the LOS probability meets the threshold probability.

Aspect 32 is the apparatus of any of aspects 21 to 31, where the one or more indications of signal or beam information includes at least a second NLOS probability if the NLOS probability does not meet the threshold probability, and where the one or more indications of signal or beam information does not include NLOS probabilities other than the NLOS probability if the NLOS probability meets the threshold probability.

Aspect 33 is the apparatus of any of aspects 21 to 32, where the at least one processor is further configured to: transmit, to the first wireless device, a configuration for at least one RSRP threshold, and where the one or more indications of signal or beam information includes the at least one of the LOS probability or the NLOS probability of the at least one signal or beam path that exceeds the at least one RSRP threshold.

Aspect 34 is the apparatus of any of aspects 21 to 33, where to receive the one or more indications of signal or beam information associated with the at least one signal or beam path, the at least one processor is further configured to: receive the one or more indications of signal or beam information in an order that is based on a RSRP, the at least one of the LOS probability or the NLOS probability, an angle, a timing, a phase, or a power associated with the at least one signal or beam path.

Aspect 35 is a method of wireless communication for implementing any of aspects 21 to 34.

Aspect 36 is an apparatus for wireless communication including means for implementing any of aspects 21 to 34.

Aspect 37 is a computer-readable medium storing computer executable code, where the code when executed by a processor causes the processor to implement any of aspects 21 to 34.

What is claimed is:

1. An apparatus for wireless communication at a first wireless device, comprising:

at least one memory;

a transceiver; and at least one processor, communicatively connected to the at least one memory and the transceiver, the at least one processor configured to:

receive, from a second wireless device, one or more of an indication of a maximum number of measurement reports or an indication of a threshold probability associated with at least one of a line-of-sight (LOS) probability or a non-line-of-sight (NLOS) probability for a plurality of signal or beam paths;

calculate at least one of an LOS probability or an NLOS probability of at least one signal or beam path of the plurality of signal or beam paths; and transmit, to the second wireless device, one or more indications of signal or beam information associated with the at least one signal or beam path based on one or more of the maximum number of measurement reports or the threshold probability, the one or more indications of signal or beam information including at least one of the LOS probability or the NLOS probability, wherein the one or more indications of signal or beam information include multiple LOS probabilities or multiple NLOS probabilities that are associated with multiple signal or beam paths of the plurality of signal or beam paths, wherein a sum of the multiple LOS probabilities or a sum of the multiple NLOS probabilities is greater than or equal to the threshold probability.

2. The apparatus of claim 1, wherein the first wireless device is a user equipment (UE) or a positioning reference device, and wherein the second wireless device is a network that corresponds to at least one of a location management function (LMF), a base station, or a transmission-reception point (TRP).

3. The apparatus of claim 1, wherein the first wireless device is a user equipment (UE) or a network that corresponds to at least one of a location management function (LMF), a base station, or a transmission-reception point (TRP), and wherein the second wireless device is a UE.

4. The apparatus of claim 1, wherein the at least one of the LOS probability or the NLOS probability is calculated based on one or more positioning reference signals (PRSs) or sounding reference signals (SRSs) received from the second wireless device.

5. The apparatus of claim 1, wherein the one or more indications of signal or beam information further include at least one of an angle, a timing, a phase, or a power associated with the at least one signal or beam path.

6. The apparatus of claim 1, wherein the at least one processor is further configured to:

determine whether the at least one of the LOS probability or the NLOS probability of the at least one signal or beam path is greater than or equal to the threshold probability.

7. The apparatus of claim 1, wherein to transmit the one or more indications of signal or beam information associated with the at least one signal or beam path, the at least one processor is further configured to:

transmit the multiple LOS probabilities in a decreasing order or the multiple NLOS probabilities in an increasing order.

8. The apparatus of claim 1, wherein to transmit the one or more indications of signal or beam information associated with the at least one signal or beam path, the at least one processor is further configured to:

exclude one or more LOS probabilities from the multiple LOS probabilities or exclude one or more NLOS probabilities from the multiple NLOS probabilities based on a payload capacity of a measurement report.

9. The apparatus of claim 1, wherein a highest LOS probability in the multiple LOS probabilities or a lowest NLOS probability in the multiple NLOS probabilities does not meet the threshold probability.

10. The apparatus of claim 1, where in the at least one processor is further configured to:

determine whether the at least one signal or beam path has a reference signal received power (RSRP) exceeding at least one RSRP threshold, and wherein the one or more indications of signal or beam information includes the at least one of the LOS probability or the NLOS probability of the at least one signal or beam path that exceeds the at least one RSRP threshold.

11. The apparatus of claim 10, where in the at least one processor is further configured to:

receive, from the second wireless device, a configuration for the at least one RSRP threshold.

12. The apparatus of claim 1, wherein to transmit the one or more indications of signal or beam information associated with the at least one signal or beam path, the at least one processor is further configured to:

transmit the one or more indications of signal or beam information in an order that is based on a reference signal received power (RSRP), the at least one of the LOS probability or the NLOS probability, an angle, a timing, a phase, or a power associated with the at least one signal or beam path.

13. An apparatus for wireless communication at a first wireless device, comprising:

at least one memory;

a transceiver; and at least one processor, communicatively connected to the at least one memory and the transceiver, the at least one processor configured to:

receive, from a second wireless device, one or more of an indication of a maximum number of measurement reports or an indication of a threshold probability associated with at least one of a line-of-sight (LOS) probability or a non-line-of-sight (NLOS) probability for a plurality of signal or beam paths;

calculate at least one of an LOS probability or an NLOS probability of at least one signal or beam path of the plurality of signal or beam paths; and transmit, to the second wireless device, one or more indications of signal or beam information associated with the at least one signal or beam path based on one or more of the maximum number of measurement reports or the threshold probability, the one or more indications of signal or beam information including at least one of the LOS probability or the NLOS probability, wherein the one or more indications of signal or beam information includes the LOS probability or the NLOS probability that is associated with a first signal or beam path of the plurality of signal or beam paths, wherein the one or more indications of signal or beam information includes (1) at least a second LOS probability if the LOS probability does not meet the threshold probability or (2) at least a second NLOS probability if the NLOS probability does not meet the threshold probability, and wherein the one or more indications of signal or beam information (1) does not include LOS probabilities other than the LOS probability if the LOS probability meets the threshold probability or (2) does not include NLOS probabilities other than the NLOS probability if the NLOS probability meets the threshold probability.

14. An apparatus for wireless communication at a second wireless device, comprising:

at least one memory;

a transceiver; and at least one processor, communicatively connected to the at least one memory and the transceiver, the at least one processor configured to:

configure one or more of a maximum number of measurement reports or a threshold probability associated with at least one of a line-of-sight (LOS) probability or a non-line-of-sight (NLOS) probability for a plurality of signal or beam paths;

transmit, to a first wireless device, one or more of an indication of the maximum number of measurement reports or an indication of the threshold probability associated with at least one of the LOS probability or the NLOS probability for the plurality of signal or beam paths; and receive, from the first wireless device, one or more indications of signal or beam information associated with at least one signal or beam path based on one or more of the maximum number of measurement reports or the threshold probability, the one or more indications of signal or beam information including at least one of the LOS probability or the NLOS probability, wherein the one or more indications of signal or beam information includes multiple LOS probabilities or multiple NLOS probabilities that are associated with multiple signal or beam paths of the plurality of signal or beam paths, wherein a sum of the multiple LOS probabilities or a sum of the multiple NLOS probabilities is greater than or equal to the threshold probability.

15. The apparatus of claim 14, wherein the first wireless device is a user equipment (UE) or a positioning reference device, and wherein the second wireless device is a network that corresponds to at least one of a location management function (LMF), a base station, or a transmission-reception point (TRP).

16. The apparatus of claim 14, wherein the first wireless device is a user equipment (UE) or a network that corresponds to at least one of a location management function (LMF), a base station, or a transmission-reception point (TRP), and wherein the second wireless device is a UE.

17. The apparatus of claim 14, wherein the one or more indications of signal or beam information further includes at least one of an angle, a timing, a phase, or a power associated with the at least one signal or beam path.

18. The apparatus of claim 14, wherein to receive the one or more indications of signal or beam information associated with the at least one signal or beam path, the at least one processor is further configured to:

receive the multiple LOS probabilities in a decreasing order or the multiple NLOS probabilities in an increasing order.

19. The apparatus of claim 14, wherein a highest LOS probability in the multiple LOS probabilities or a lowest NLOS probability in the multiple NLOS probabilities does not meet the threshold probability.

20. The apparatus of claim 14, wherein the one or more indications of signal or beam information includes the LOS probability or the NLOS probability that is associated with a first signal or beam path of the plurality of signal or beam paths.

21. The apparatus of claim 14, where in the at least one processor is further configured to:

transmit, to the first wireless device, a configuration for at least one reference signal received power (RSRP) threshold, and wherein the one or more indications of signal or beam information includes the at least one of the LOS probability or the NLOS probability of the at least one signal or beam path that exceeds at least one RSRP threshold.

22. The apparatus of claim 14, wherein to receive the one or more indications of signal or beam information associated with the at least one signal or beam path, the at least one processor is further configured to:

receive the one or more indications of signal or beam information in an order that is based on a reference signal received power (RSRP), the at least one of the LOS probability or the NLOS probability, an angle, a timing, a phase, or a power associated with the at least one signal or beam path.

23. An apparatus for wireless communication at a second wireless device, comprising:

at least one memory;

a transceiver; and at least one processor, communicatively connected to the at least one memory and the transceiver, the at least one processor configured to:

configure one or more of a maximum number of measurement reports or a threshold probability associated with at least one of a line-of-sight (LOS) probability or a non-line-of-sight (NLOS) probability for a plurality of signal or beam paths;

transmit, to a first wireless device, one or more of an indication of the maximum number of measurement reports or an indication of the threshold probability associated with at least one of the LOS probability or the NLOS probability for the plurality of signal or beam paths; and receive, from the first wireless device, one or more indications of signal or beam information associated with at least one signal or beam path based on one or more of the maximum number of measurement reports or the threshold probability, the one or more indications of signal or beam information including at least one of the LOS probability or the NLOS probability, wherein the one or more indications of signal or beam information includes the LOS probability or the NLOS probability that is associated with a first signal or beam path of the plurality of signal or beam paths, wherein the one or more indications of signal or beam information includes (1) at least a second LOS probability if the LOS probability does not meet the threshold probability or (2) at least a second NLOS probability if the NLOS probability does not meet the threshold probability, and wherein the one or more indications of signal or beam information (1) does not include LOS probabilities other than the LOS probability if the LOS probability meets the threshold probability or (2) does not include NLOS probabilities other than the NLOS probability if the NLOS probability meets the threshold probability.

* * * * *